(12) United States Patent
Bousfield, III

(10) Patent No.: US 9,876,347 B2
(45) Date of Patent: Jan. 23, 2018

(54) APPARATUS AND METHODS FOR RESTORING POWER CELL FUNCTIONALITY IN MULTI-CELL POWER SUPPLIES

(71) Applicant: John Channing Bousfield, III, Murrysville, PA (US)

(72) Inventor: John Channing Bousfield, III, Murrysville, PA (US)

(73) Assignee: SIEMENS AKTIENGESELLSCHAFT, München (DE)

(*) Notice: Subject to any disclaimer, the term of this patent is extended or adjusted under 35 U.S.C. 154(b) by 20 days.

(21) Appl. No.: 14/010,621

(22) Filed: Aug. 27, 2013

(65) Prior Publication Data

US 2014/0063870 A1 Mar. 6, 2014

Related U.S. Application Data

(60) Provisional application No. 61/695,023, filed on Aug. 30, 2012.

(51) Int. Cl.
*H02M 7/5387* (2007.01)
*H02M 7/5395* (2006.01)
(Continued)

(52) U.S. Cl.
CPC ............ *H02H 7/1216* (2013.01); *H02J 3/26* (2013.01); *H02M 1/32* (2013.01); *H02M 5/458* (2013.01);
(Continued)

(58) Field of Classification Search
CPC ...... H02M 1/12; H02M 7/5395; H02M 1/092; H02M 1/32
(Continued)

(56) References Cited

U.S. PATENT DOCUMENTS 5,625,545 A 4/1997 Hammond
5,986,909 A * 11/1999 Hammond .............. H02M 7/49
363/37

(Continued)

FOREIGN PATENT DOCUMENTS

CN 101548460 A 9/2009
CN 101689800 A 3/2010
(Continued)

OTHER PUBLICATIONS

Gemmell B. et. al; "Prospects of multilevel VSC technologies for power transmission"; Transmission and Distribution Conference and Exposition, 2008. T&D. IEEE/PES, IEEE, Piscataway, NJ; pp. 1-16; ISBN: 978-1-4244-1903-6, XP031250215; 2008; US; Apr. 21, 2008.

(Continued)

*Primary Examiner* — Adolf Berhane
*Assistant Examiner* — Sisay G Tiku

(57) ABSTRACT

A method is provided for operating a multi-cell power supply that includes multiple series-connected power cells in each of multiple legs. Each power cell includes a bypass device that may be used to selectively bypass and de-bypass the power cell. After a first power cell faults and is bypassed as a result of the fault, the method includes de-bypassing the first power cell without stopping the multi-cell power supply if the first power cell fault was caused by a predetermined operating condition. Numerous other aspects are provided.

18 Claims, 23 Drawing Sheets

(51) Int. Cl.
- *H02M 1/32* (2007.01)
- *H02M 1/12* (2006.01)
- *H02M 1/092* (2006.01)
- *H02H 7/12* (2006.01)
- *H02J 3/26* (2006.01)
- *H02M 5/458* (2006.01)
- *H02M 7/49* (2007.01)

(52) U.S. Cl.
CPC ......... *H02M 7/49* (2013.01); *H02M 7/53873* (2013.01); *H02M 2001/325* (2013.01); *Y02E 40/50* (2013.01)

(58) Field of Classification Search
USPC .......................................... 363/39, 41, 54–72
See application file for complete search history.

(56) References Cited

U.S. PATENT DOCUMENTS

| | | | |
|---|---|---|---|
| 6,014,323 A | 1/2000 | Aiello | |
| 6,166,513 A | 12/2000 | Hammond | |
| 6,320,767 B1* | 11/2001 | Shimoura | H02M 7/49 363/37 |
| 7,508,147 B2 | 3/2009 | Yusuke | |
| 8,169,107 B2 | 5/2012 | Hammond | |
| 2008/0081244 A1 | 4/2008 | Hammond | |
| 2008/0174182 A1* | 7/2008 | Hammond | H02J 3/46 307/85 |
| 2009/0083553 A1* | 3/2009 | Buckey | H02M 7/49 713/300 |
| 2010/0301975 A1* | 12/2010 | Hammond | H02M 7/483 335/185 |
| 2012/0063181 A1* | 3/2012 | Chimento et al. | 363/56.03 |
| 2012/0181955 A1* | 7/2012 | Sodo et al. | 318/375 |
| 2013/0121042 A1* | 5/2013 | Gan | H02M 7/49 363/37 |
| 2014/0042817 A1* | 2/2014 | Zargari | H02M 1/32 307/72 |

FOREIGN PATENT DOCUMENTS

| | | |
|---|---|---|
| DE | 102007031140 A1 | 1/2009 |
| RU | 46388 U1 | 6/2005 |
| WO | 2008009502 A1 | 1/2008 |
| WO | 2008067787 A1 | 6/2008 |
| WO | 2010145688 A1 | 12/2010 |
| WO | 2011134500 A1 | 11/2011 |
| WO | 2012033958 A1 | 3/2012 |

OTHER PUBLICATIONS

Andersen, B. Ed.; "A H Bridge PEBB for STATCOMs and other VSC Applications;" Institute of Electrical and Electronics Engineers; 2003 IEEE Power Engineering Society General Meeting, Conference Proceedings; Toronto, Ontario, CA; IEEE Power Engineering Society, New York, NY: IEEE, US, vol. 3, pp. 1356-1359; XP010683862; 2003; Jul. 13, 2003.

PCT International Search Report dated Mar. 20, 2014 corresponding to PCT International Application No. PCT/US2013/057281 filed Aug. 29, 2013 (13 pages).

* cited by examiner

| A cells = 1 | B cells = 1 | C cells = 0 | Vmax % = 28.9 | $A_p$ = 30.0 | $B_p$ = 90.0 | $C_p$ = 272.3 |
| --- | --- | --- | --- | --- | --- | --- |
| A cells = 1 | B cells = 1 | C cells = 1 | Vmax % = 50.0 | $A_p$ = 0.0 | $B_p$ = 120.0 | $C_p$ = 240.0 |
| A cells = 2 | B cells = 1 | C cells = 1 | Vmax % = 50.0 | $A_p$ = 0.0 | $B_p$ = 60.0 | $C_p$ = 300.0 |
| A cells = 2 | B cells = 2 | C cells = 0 | Vmax % = 57.7 | $A_p$ = 30.0 | $B_p$ = 90.0 | $C_p$ = 272.3 |
| A cells = 2 | B cells = 2 | C cells = 1 | Vmax % = 80.9 | $A_p$ = 15.5 | $B_p$ = 104.5 | $C_p$ = 240.0 |
| A cells = 2 | B cells = 2 | C cells = 2 | Vmax % = 100.0 | $A_p$ = 0.0 | $B_p$ = 120.0 | $C_p$ = 240.0 |

Original number of cells = 2

FIG. 8A

| A cells = 1 | B cells = 1 | C cells = 0 | Vmax % = 19.2 | $A_p$ = 30.0 | $B_p$ = 90.0 | $C_p$ = 272.3 |
| --- | --- | --- | --- | --- | --- | --- |
| A cells = 1 | B cells = 1 | C cells = 1 | Vmax % = 33.3 | $A_p$ = 0.0 | $B_p$ = 120.0 | $C_p$ = 240.0 |
| A cells = 2 | B cells = 1 | C cells = 1 | Vmax % = 33.3 | $A_p$ = 0.0 | $B_p$ = 60.0 | $C_p$ = 300.0 |
| A cells = 2 | B cells = 2 | C cells = 1 | Vmax % = 38.5 | $A_p$ = 30.0 | $B_p$ = 90.0 | $C_p$ = 272.3 |
| A cells = 2 | B cells = 2 | C cells = 2 | Vmax % = 53.9 | $A_p$ = 15.5 | $B_p$ = 104.5 | $C_p$ = 240.0 |
| A cells = 3 | B cells = 2 | C cells = 2 | Vmax % = 66.7 | $A_p$ = 0.0 | $B_p$ = 120.0 | $C_p$ = 240.0 |
| A cells = 3 | B cells = 3 | C cells = 2 | Vmax % = 75.5 | $A_p$ = 0.0 | $B_p$ = 101.4 | $C_p$ = 258.6 |
| A cells = 3 | B cells = 3 | C cells = 0 | Vmax % = 57.7 | $A_p$ = 30.0 | $B_p$ = 90.0 | $C_p$ = 272.3 |
| A cells = 3 | B cells = 3 | C cells = 1 | Vmax % = 73.6 | $A_p$ = 20.4 | $B_p$ = 99.6 | $C_p$ = 240.0 |
| A cells = 3 | B cells = 3 | C cells = 2 | Vmax % = 87.8 | $A_p$ = 10.5 | $B_p$ = 109.5 | $C_p$ = 240.0 |
| A cells = 3 | B cells = 3 | C cells = 3 | Vmax % = 100.0 | $A_p$ = 0.0 | $B_p$ = 120.0 | $C_p$ = 240.0 |

Original number of cells = 3

FIG. 8B

Original number of cells = 4

| A cells | B cells | C cells | Vmax % | $A_p$ | $B_p$ | $C_p$ |
|---|---|---|---|---|---|---|
| 1 | 1 | 0 | 14.4 | 30.0 | 90.0 | 272.3 |
| 1 | 1 | 1 | 25.0 | 0.0 | 120.0 | 240.0 |
| 2 | 1 | 1 | 25.0 | 0.0 | 60.0 | 300.0 |
| 2 | 2 | 0 | 28.9 | 30.0 | 90.0 | 272.3 |
| 2 | 2 | 1 | 40.5 | 15.5 | 104.5 | 240.0 |
| 2 | 2 | 2 | 50.0 | 0.0 | 120.0 | 240.0 |
| 3 | 2 | 2 | 56.6 | 0.0 | 101.4 | 258.6 |
| 3 | 3 | 0 | 43.3 | 30.0 | 90.0 | 272.3 |
| 3 | 3 | 1 | 55.2 | 20.4 | 99.6 | 240.0 |
| 3 | 3 | 2 | 65.8 | 10.5 | 109.5 | 240.0 |
| 3 | 3 | 3 | 75.0 | 0.0 | 120.0 | 240.0 |
| 4 | 2 | 2 | 50.0 | 0.0 | 60.0 | 300.0 |
| 4 | 3 | 1 | 52.1 | 16.1 | 76.2 | 315.8 |
| 4 | 3 | 2 | 71.5 | 7.2 | 96.2 | 260.7 |
| 4 | 3 | 3 | 82.3 | 0.0 | 108.2 | 251.8 |
| 4 | 4 | 0 | 57.7 | 30.0 | 90.0 | 272.3 |
| 4 | 4 | 1 | 69.8 | 22.8 | 97.2 | 240.0 |
| 4 | 4 | 2 | 80.9 | 15.5 | 104.5 | 240.0 |
| 4 | 4 | 3 | 91.0 | 8.0 | 112.0 | 240.0 |
| 4 | 4 | 4 | 100.0 | 0.0 | 120.0 | 240.0 |

FIG. 8C

Original number of cells = 5

| | | | | | | | | | | | | | |
|---|---|---|---|---|---|---|---|---|---|---|---|---|---|
| A cells = 1 | B cells = 1 | C cells = 0 | Vmax % = 11.5 | $A_p$ = 30.0 | $B_p$ = 90.0 | $C_p$ = 272.3 |
| A cells = 1 | B cells = 1 | C cells = 1 | Vmax % = 20.0 | $A_p$ = 0.0 | $B_p$ = 120.0 | $C_p$ = 240.0 |
| A cells = 2 | B cells = 1 | C cells = 1 | Vmax % = 20.0 | $A_p$ = 0.0 | $B_p$ = 60.0 | $C_p$ = 300.0 |
| A cells = 2 | B cells = 2 | C cells = 0 | Vmax % = 23.1 | $A_p$ = 30.0 | $B_p$ = 90.0 | $C_p$ = 272.3 |
| A cells = 2 | B cells = 2 | C cells = 1 | Vmax % = 32.4 | $A_p$ = 15.5 | $B_p$ = 104.5 | $C_p$ = 240.0 |
| A cells = 2 | B cells = 2 | C cells = 2 | Vmax % = 40.0 | $A_p$ = 0.0 | $B_p$ = 120.0 | $C_p$ = 240.0 |
| A cells = 3 | B cells = 3 | C cells = 0 | Vmax % = 45.3 | $A_p$ = 30.0 | $B_p$ = 101.4 | $C_p$ = 258.6 |
| A cells = 3 | B cells = 3 | C cells = 1 | Vmax % = 34.6 | $A_p$ = 0.0 | $B_p$ = 90.0 | $C_p$ = 272.3 |
| A cells = 3 | B cells = 3 | C cells = 2 | Vmax % = 44.2 | $A_p$ = 20.4 | $B_p$ = 99.6 | $C_p$ = 240.0 |
| A cells = 3 | B cells = 3 | C cells = 3 | Vmax % = 52.7 | $A_p$ = 10.5 | $B_p$ = 109.5 | $C_p$ = 240.0 |
| A cells = 3 | B cells = 2 | C cells = 2 | Vmax % = 60.0 | $A_p$ = 0.0 | $B_p$ = 120.0 | $C_p$ = 240.0 |
| A cells = 4 | B cells = 4 | C cells = 3 | Vmax % = 40.0 | $A_p$ = 0.0 | $B_p$ = 60.0 | $C_p$ = 300.0 |
| A cells = 4 | B cells = 2 | C cells = 1 | Vmax % = 41.7 | $A_p$ = 16.1 | $B_p$ = 76.2 | $C_p$ = 315.8 |
| A cells = 4 | B cells = 3 | C cells = 2 | Vmax % = 57.2 | $A_p$ = 7.2 | $B_p$ = 96.2 | $C_p$ = 260.7 |
| A cells = 4 | B cells = 4 | C cells = 3 | Vmax % = 65.8 | $A_p$ = 0.0 | $B_p$ = 108.2 | $C_p$ = 251.8 |
| A cells = 4 | B cells = 4 | C cells = 0 | Vmax % = 46.2 | $A_p$ = 30.0 | $B_p$ = 90.0 | $C_p$ = 272.3 |
| A cells = 4 | B cells = 4 | C cells = 1 | Vmax % = 55.8 | $A_p$ = 22.8 | $B_p$ = 97.2 | $C_p$ = 240.0 |
| A cells = 4 | B cells = 4 | C cells = 2 | Vmax % = 64.7 | $A_p$ = 15.5 | $B_p$ = 104.5 | $C_p$ = 240.0 |
| A cells = 4 | B cells = 4 | C cells = 3 | Vmax % = 72.8 | $A_p$ = 8.0 | $B_p$ = 112.0 | $C_p$ = 240.0 |
| A cells = 4 | B cells = 4 | C cells = 4 | Vmax % = 80.0 | $A_p$ = 0.0 | $B_p$ = 120.0 | $C_p$ = 240.0 |
| A cells = 5 | B cells = 3 | C cells = 2 | Vmax % = 51.0 | $A_p$ = 6.5 | $B_p$ = 67.6 | $C_p$ = 304.9 |
| A cells = 5 | B cells = 3 | C cells = 3 | Vmax % = 69.1 | $A_p$ = 0.0 | $B_p$ = 93.6 | $C_p$ = 266.4 |
| A cells = 5 | B cells = 4 | C cells = 1 | Vmax % = 53.4 | $A_p$ = 18.9 | $B_p$ = 79.6 | $C_p$ = 316.1 |
| A cells = 5 | B cells = 4 | C cells = 2 | Vmax % = 69.0 | $A_p$ = 11.6 | $B_p$ = 93.9 | $C_p$ = 262.1 |
| A cells = 5 | B cells = 4 | C cells = 3 | Vmax % = 78.1 | $A_p$ = 5.9 | $B_p$ = 102.8 | $C_p$ = 252.8 |
| A cells = 5 | B cells = 4 | C cells = 4 | Vmax % = 86.1 | $A_p$ = 0.0 | $B_p$ = 111.3 | $C_p$ = 248.7 |
| A cells = 5 | B cells = 5 | C cells = 0 | Vmax % = 57.7 | $A_p$ = 30.0 | $B_p$ = 90.0 | $C_p$ = 272.3 |
| A cells = 5 | B cells = 5 | C cells = 1 | Vmax % = 67.4 | $A_p$ = 24.3 | $B_p$ = 95.7 | $C_p$ = 240.0 |
| A cells = 5 | B cells = 5 | C cells = 2 | Vmax % = 76.6 | $A_p$ = 18.5 | $B_p$ = 101.5 | $C_p$ = 240.0 |
| A cells = 5 | B cells = 5 | C cells = 3 | Vmax % = 85.1 | $A_p$ = 12.5 | $B_p$ = 107.5 | $C_p$ = 240.0 |
| A cells = 5 | B cells = 5 | C cells = 4 | Vmax % = 92.9 | $A_p$ = 6.4 | $B_p$ = 113.6 | $C_p$ = 240.0 |
| A cells = 5 | B cells = 5 | C cells = 5 | Vmax % = 100.0 | $A_p$ = 0.0 | $B_p$ = 120.0 | $C_p$ = 240.0 |

FIG. 8D

Original number of cells = 6

| | | | | | | | | | | | | |
|---|---|---|---|---|---|---|---|---|---|---|---|---|
| A cells = 1 | B cells = 1 | C cells = 0 | Vmax % = 9.6 | $A_p$ = 30.0 | $B_p$ = 90.0 | $C_p$ = 272.3 |
| A cells = 1 | B cells = 1 | C cells = 1 | Vmax % = 16.7 | $A_p$ = 0.0 | $B_p$ = 120.0 | $C_p$ = 240.0 |
| A cells = 1 | B cells = 1 | C cells = 1 | Vmax % = 16.7 | $A_p$ = 0.0 | $B_p$ = 60.0 | $C_p$ = 300.0 |
| A cells = 2 | B cells = 2 | C cells = 0 | Vmax % = 19.2 | $A_p$ = 30.0 | $B_p$ = 90.0 | $C_p$ = 272.3 |
| A cells = 2 | B cells = 2 | C cells = 1 | Vmax % = 27.0 | $A_p$ = 15.5 | $B_p$ = 104.5 | $C_p$ = 240.0 |
| A cells = 2 | B cells = 2 | C cells = 2 | Vmax % = 33.3 | $A_p$ = 0.0 | $B_p$ = 120.0 | $C_p$ = 240.0 |
| A cells = 3 | B cells = 3 | C cells = 0 | Vmax % = 37.7 | $A_p$ = 30.0 | $B_p$ = 101.4 | $C_p$ = 258.6 |
| A cells = 2 | B cells = 3 | C cells = 1 | Vmax % = 28.9 | $A_p$ = 0.0 | $B_p$ = 90.0 | $C_p$ = 272.3 |
| A cells = 3 | B cells = 3 | C cells = 2 | Vmax % = 36.8 | $A_p$ = 20.4 | $B_p$ = 99.6 | $C_p$ = 240.0 |
| A cells = 3 | B cells = 3 | C cells = 3 | Vmax % = 43.9 | $A_p$ = 10.5 | $B_p$ = 109.5 | $C_p$ = 240.0 |
| A cells = 3 | B cells = 2 | C cells = 2 | Vmax % = 50.0 | $A_p$ = 0.0 | $B_p$ = 120.0 | $C_p$ = 240.0 |
| A cells = 4 | B cells = 3 | C cells = 1 | Vmax % = 33.3 | $A_p$ = 0.0 | $B_p$ = 60.0 | $C_p$ = 300.0 |
| A cells = 4 | B cells = 4 | C cells = 2 | Vmax % = 34.7 | $A_p$ = 16.1 | $B_p$ = 76.2 | $C_p$ = 315.8 |
| A cells = 4 | B cells = 4 | C cells = 1 | Vmax % = 47.7 | $A_p$ = 7.2 | $B_p$ = 96.2 | $C_p$ = 260.7 |
| A cells = 4 | B cells = 4 | C cells = 2 | Vmax % = 54.9 | $A_p$ = 0.0 | $B_p$ = 108.2 | $C_p$ = 251.8 |
| A cells = 4 | B cells = 4 | C cells = 3 | Vmax % = 38.5 | $A_p$ = 30.0 | $B_p$ = 90.0 | $C_p$ = 272.3 |
| A cells = 4 | B cells = 4 | C cells = 0 | Vmax % = 46.5 | $A_p$ = 22.8 | $B_p$ = 97.2 | $C_p$ = 240.0 |
| A cells = 4 | B cells = 3 | C cells = 1 | Vmax % = 53.9 | $A_p$ = 15.5 | $B_p$ = 104.5 | $C_p$ = 240.0 |
| A cells = 5 | B cells = 3 | C cells = 2 | Vmax % = 60.7 | $A_p$ = 8.0 | $B_p$ = 112.0 | $C_p$ = 240.0 |
| A cells = 4 | B cells = 3 | C cells = 3 | Vmax % = 66.7 | $A_p$ = 0.0 | $B_p$ = 120.0 | $C_p$ = 240.0 |
| A cells = 5 | B cells = 4 | C cells = 4 | Vmax % = 42.5 | $A_p$ = 6.5 | $B_p$ = 67.6 | $C_p$ = 304.9 |
| A cells = 4 | B cells = 4 | C cells = 2 | Vmax % = 57.6 | $A_p$ = 0.0 | $B_p$ = 93.6 | $C_p$ = 266.4 |
| A cells = 5 | B cells = 5 | C cells = 3 | Vmax % = 44.5 | $A_p$ = 18.9 | $B_p$ = 79.6 | $C_p$ = 316.1 |
| A cells = 5 | B cells = 5 | C cells = 1 | Vmax % = 57.5 | $A_p$ = 11.6 | $B_p$ = 93.9 | $C_p$ = 262.1 |
| A cells = 5 | B cells = 5 | C cells = 2 | Vmax % = 65.1 | $A_p$ = 5.9 | $B_p$ = 102.8 | $C_p$ = 252.8 |
| A cells = 5 | B cells = 5 | C cells = 3 | Vmax % = 71.7 | $A_p$ = 0.0 | $B_p$ = 111.3 | $C_p$ = 248.7 |
| A cells = 5 | B cells = 4 | C cells = 4 | Vmax % = 48.1 | $A_p$ = 30.0 | $B_p$ = 90.0 | $C_p$ = 272.3 |
| A cells = 5 | B cells = 5 | C cells = 0 | Vmax % = 56.2 | $A_p$ = 24.3 | $B_p$ = 95.7 | $C_p$ = 240.0 |
| A cells = 5 | B cells = 5 | C cells = 1 | Vmax % = 63.8 | $A_p$ = 18.5 | $B_p$ = 101.5 | $C_p$ = 240.0 |
| A cells = 5 | B cells = 5 | C cells = 2 | Vmax % = 70.9 | $A_p$ = 12.5 | $B_p$ = 107.5 | $C_p$ = 240.0 |
| A cells = 5 | B cells = 5 | C cells = 3 | Vmax % = 77.4 | $A_p$ = 6.4 | $B_p$ = 113.6 | $C_p$ = 240.0 |
| A cells = 5 | B cells = 5 | C cells = 4 | Vmax % = 83.3 | $A_p$ = 0.0 | $B_p$ = 120.0 | $C_p$ = 240.0 |
| A cells = 6 | B cells = 3 | C cells = 3 | Vmax % = 50.0 | $A_p$ = 0.0 | $B_p$ = 60.0 | $C_p$ = 300.0 |

FIG. 8E-1

Original number of cells = 6 (continued)

| | | | | | | | | | | | |
|---|---|---|---|---|---|---|---|---|---|---|---|
| A cells = 6 | B cells = 4 | C cells = 3 | Vmax % = 67.3 | $A_p$ = 4.8 | $B_p$ = 91.2 | $C_p$ = 268.4 |
| A cells = 6 | B cells = 4 | C cells = 4 | Vmax % = 75.5 | $A_p$ = 0.0 | $B_p$ = 101.4 | $C_p$ = 258.6 |
| A cells = 6 | B cells = 5 | C cells = 1 | Vmax % = 55.1 | $A_p$ = 20.5 | $B_p$ = 82.4 | $C_p$ = 311.3 |
| A cells = 6 | B cells = 5 | C cells = 2 | Vmax % = 67.2 | $A_p$ = 14.5 | $B_p$ = 92.7 | $C_p$ = 263.2 |
| A cells = 6 | B cells = 5 | C cells = 3 | Vmax % = 75.1 | $A_p$ = 9.8 | $B_p$ = 99.8 | $C_p$ = 253.6 |
| A cells = 6 | B cells = 5 | C cells = 4 | Vmax % = 82.1 | $A_p$ = 5.0 | $B_p$ = 106.5 | $C_p$ = 249.3 |
| A cells = 6 | B cells = 5 | C cells = 5 | Vmax % = 88.5 | $A_p$ = 0.0 | $B_p$ = 113.1 | $C_p$ = 246.9 |
| A cells = 6 | B cells = 6 | C cells = 0 | Vmax % = 57.7 | $A_p$ = 30.0 | $B_p$ = 90.0 | $C_p$ = 272.3 |
| A cells = 6 | B cells = 6 | C cells = 1 | Vmax % = 65.9 | $A_p$ = 25.2 | $B_p$ = 94.8 | $C_p$ = 240.0 |
| A cells = 6 | B cells = 6 | C cells = 2 | Vmax % = 73.6 | $A_p$ = 20.4 | $B_p$ = 99.6 | $C_p$ = 240.0 |
| A cells = 6 | B cells = 6 | C cells = 3 | Vmax % = 80.9 | $A_p$ = 15.5 | $B_p$ = 104.5 | $C_p$ = 240.0 |
| A cells = 6 | B cells = 6 | C cells = 4 | Vmax % = 87.8 | $A_p$ = 10.5 | $B_p$ = 109.5 | $C_p$ = 240.0 |
| A cells = 6 | B cells = 6 | C cells = 5 | Vmax % = 94.1 | $A_p$ = 5.4 | $B_p$ = 114.6 | $C_p$ = 240.0 |
| A cells = 6 | B cells = 6 | C cells = 6 | Vmax % = 100.0 | $A_p$ = 0.0 | $B_p$ = 120.0 | $C_p$ = 240.0 |

FIG. 8E-2

Original number of cells = 7

| A cells | B cells | C cells | Vmax % | $A_p$ | $B_p$ | $C_p$ |
|---|---|---|---|---|---|---|
| A cells = 1 | B cells = 1 | C cells = 0 | Vmax % = 8.2 | $A_p$ = 30.0 | $B_p$ = 90.0 | $C_p$ = 272.3 |
| A cells = 1 | B cells = 1 | C cells = 1 | Vmax % = 14.3 | $A_p$ = 0.0 | $B_p$ = 120.0 | $C_p$ = 240.0 |
| A cells = 2 | B cells = 2 | C cells = 1 | Vmax % = 14.3 | $A_p$ = 0.0 | $B_p$ = 60.0 | $C_p$ = 300.0 |
| A cells = 2 | B cells = 2 | C cells = 0 | Vmax % = 16.5 | $A_p$ = 30.0 | $B_p$ = 90.0 | $C_p$ = 272.3 |
| A cells = 2 | B cells = 2 | C cells = 1 | Vmax % = 23.1 | $A_p$ = 15.5 | $B_p$ = 104.5 | $C_p$ = 240.0 |
| A cells = 2 | B cells = 2 | C cells = 2 | Vmax % = 28.6 | $A_p$ = 0.0 | $B_p$ = 120.0 | $C_p$ = 240.0 |
| A cells = 2 | B cells = 3 | C cells = 2 | Vmax % = 32.3 | $A_p$ = 0.0 | $B_p$ = 101.4 | $C_p$ = 258.6 |
| A cells = 3 | B cells = 3 | C cells = 0 | Vmax % = 24.7 | $A_p$ = 30.0 | $B_p$ = 90.0 | $C_p$ = 272.3 |
| A cells = 3 | B cells = 3 | C cells = 1 | Vmax % = 31.5 | $A_p$ = 20.4 | $B_p$ = 99.6 | $C_p$ = 240.0 |
| A cells = 3 | B cells = 3 | C cells = 2 | Vmax % = 37.6 | $A_p$ = 10.5 | $B_p$ = 109.5 | $C_p$ = 240.0 |
| A cells = 3 | B cells = 3 | C cells = 3 | Vmax % = 42.9 | $A_p$ = 0.0 | $B_p$ = 120.0 | $C_p$ = 240.0 |
| A cells = 3 | B cells = 2 | C cells = 2 | Vmax % = 28.6 | $A_p$ = 0.0 | $B_p$ = 60.0 | $C_p$ = 300.0 |
| A cells = 3 | B cells = 3 | C cells = 1 | Vmax % = 29.8 | $A_p$ = 16.1 | $B_p$ = 76.2 | $C_p$ = 315.8 |
| A cells = 3 | B cells = 3 | C cells = 2 | Vmax % = 40.9 | $A_p$ = 7.2 | $B_p$ = 96.2 | $C_p$ = 260.7 |
| A cells = 4 | B cells = 4 | C cells = 3 | Vmax % = 47.0 | $A_p$ = 0.0 | $B_p$ = 108.2 | $C_p$ = 251.8 |
| A cells = 4 | B cells = 4 | C cells = 0 | Vmax % = 33.0 | $A_p$ = 30.0 | $B_p$ = 90.0 | $C_p$ = 272.3 |
| A cells = 4 | B cells = 4 | C cells = 1 | Vmax % = 39.9 | $A_p$ = 22.8 | $B_p$ = 97.2 | $C_p$ = 240.0 |
| A cells = 4 | B cells = 4 | C cells = 2 | Vmax % = 46.2 | $A_p$ = 15.5 | $B_p$ = 104.5 | $C_p$ = 240.0 |
| A cells = 4 | B cells = 4 | C cells = 3 | Vmax % = 52.0 | $A_p$ = 8.0 | $B_p$ = 112.0 | $C_p$ = 240.0 |
| A cells = 4 | B cells = 4 | C cells = 4 | Vmax % = 57.1 | $A_p$ = 0.0 | $B_p$ = 120.0 | $C_p$ = 240.0 |
| A cells = 4 | B cells = 3 | C cells = 2 | Vmax % = 36.4 | $A_p$ = 6.5 | $B_p$ = 67.6 | $C_p$ = 304.9 |
| A cells = 4 | B cells = 3 | C cells = 3 | Vmax % = 49.4 | $A_p$ = 0.0 | $B_p$ = 93.6 | $C_p$ = 266.4 |
| A cells = 5 | B cells = 4 | C cells = 1 | Vmax % = 38.2 | $A_p$ = 18.9 | $B_p$ = 79.6 | $C_p$ = 316.1 |
| A cells = 5 | B cells = 4 | C cells = 2 | Vmax % = 49.3 | $A_p$ = 11.6 | $B_p$ = 93.9 | $C_p$ = 262.1 |
| A cells = 5 | B cells = 4 | C cells = 3 | Vmax % = 55.8 | $A_p$ = 5.9 | $B_p$ = 102.8 | $C_p$ = 252.8 |
| A cells = 5 | B cells = 4 | C cells = 4 | Vmax % = 61.5 | $A_p$ = 0.0 | $B_p$ = 111.3 | $C_p$ = 248.7 |
| A cells = 5 | B cells = 5 | C cells = 0 | Vmax % = 41.2 | $A_p$ = 30.0 | $B_p$ = 90.0 | $C_p$ = 272.3 |
| A cells = 5 | B cells = 5 | C cells = 1 | Vmax % = 48.2 | $A_p$ = 24.3 | $B_p$ = 95.7 | $C_p$ = 240.0 |
| A cells = 5 | B cells = 5 | C cells = 2 | Vmax % = 54.7 | $A_p$ = 18.5 | $B_p$ = 101.5 | $C_p$ = 240.0 |
| A cells = 5 | B cells = 5 | C cells = 3 | Vmax % = 60.8 | $A_p$ = 12.5 | $B_p$ = 107.5 | $C_p$ = 240.0 |
| A cells = 5 | B cells = 5 | C cells = 4 | Vmax % = 66.3 | $A_p$ = 6.4 | $B_p$ = 113.6 | $C_p$ = 240.0 |
| A cells = 5 | B cells = 5 | C cells = 5 | Vmax % = 71.4 | $A_p$ = 0.0 | $B_p$ = 120.0 | $C_p$ = 240.0 |

FIG. 8F-1

Original number of cells = 7 (continued)

| | | | | | | | | | | | | |
|---|---|---|---|---|---|---|---|---|---|---|---|---|
| A cells = 6 | B cells = 3 | C cells = 3 | Vmax % = 42.9 | $A_p$ = 0.0 | $B_p$ = 60.0 | $C_p$ = 300.0 |
| A cells = 6 | B cells = 4 | C cells = 3 | Vmax % = 57.7 | $A_p$ = 4.8 | $B_p$ = 91.2 | $C_p$ = 268.4 |
| A cells = 6 | B cells = 4 | C cells = 4 | Vmax % = 64.7 | $A_p$ = 0.0 | $B_p$ = 101.4 | $C_p$ = 258.6 |
| A cells = 6 | B cells = 5 | C cells = 1 | Vmax % = 47.2 | $A_p$ = 20.5 | $B_p$ = 82.4 | $C_p$ = 311.3 |
| A cells = 6 | B cells = 5 | C cells = 2 | Vmax % = 57.6 | $A_p$ = 14.5 | $B_p$ = 92.7 | $C_p$ = 263.2 |
| A cells = 6 | B cells = 5 | C cells = 3 | Vmax % = 64.4 | $A_p$ = 9.8 | $B_p$ = 99.8 | $C_p$ = 253.6 |
| A cells = 6 | B cells = 5 | C cells = 4 | Vmax % = 70.4 | $A_p$ = 5.0 | $B_p$ = 106.5 | $C_p$ = 249.3 |
| A cells = 6 | B cells = 5 | C cells = 5 | Vmax % = 75.9 | $A_p$ = 0.0 | $B_p$ = 113.1 | $C_p$ = 246.9 |
| A cells = 6 | B cells = 6 | C cells = 0 | Vmax % = 49.5 | $A_p$ = 30.0 | $B_p$ = 90.0 | $C_p$ = 272.3 |
| A cells = 6 | B cells = 6 | C cells = 1 | Vmax % = 56.5 | $A_p$ = 25.2 | $B_p$ = 94.8 | $C_p$ = 240.0 |
| A cells = 6 | B cells = 6 | C cells = 2 | Vmax % = 63.1 | $A_p$ = 20.4 | $B_p$ = 99.6 | $C_p$ = 240.0 |
| A cells = 6 | B cells = 6 | C cells = 3 | Vmax % = 69.3 | $A_p$ = 15.5 | $B_p$ = 104.5 | $C_p$ = 240.0 |
| A cells = 6 | B cells = 6 | C cells = 4 | Vmax % = 75.2 | $A_p$ = 10.5 | $B_p$ = 109.5 | $C_p$ = 240.0 |
| A cells = 6 | B cells = 6 | C cells = 5 | Vmax % = 80.7 | $A_p$ = 5.4 | $B_p$ = 114.6 | $C_p$ = 240.0 |
| A cells = 6 | B cells = 6 | C cells = 6 | Vmax % = 85.7 | $A_p$ = 0.0 | $B_p$ = 120.0 | $C_p$ = 240.0 |
| A cells = 7 | B cells = 4 | C cells = 3 | Vmax % = 52.2 | $A_p$ = 4.6 | $B_p$ = 68.0 | $C_p$ = 299.9 |
| A cells = 7 | B cells = 4 | C cells = 4 | Vmax % = 66.0 | $A_p$ = 0.0 | $B_p$ = 89.0 | $C_p$ = 271.0 |
| A cells = 7 | B cells = 5 | C cells = 3 | Vmax % = 66.0 | $A_p$ = 8.2 | $B_p$ = 90.0 | $C_p$ = 270.0 |
| A cells = 7 | B cells = 5 | C cells = 4 | Vmax % = 73.3 | $A_p$ = 4.1 | $B_p$ = 98.2 | $C_p$ = 259.7 |
| A cells = 7 | B cells = 5 | C cells = 5 | Vmax % = 79.5 | $A_p$ = 0.0 | $B_p$ = 105.6 | $C_p$ = 254.4 |
| A cells = 7 | B cells = 6 | C cells = 1 | Vmax % = 54.8 | $A_p$ = 22.1 | $B_p$ = 83.0 | $C_p$ = 317.0 |
| A cells = 7 | B cells = 6 | C cells = 2 | Vmax % = 65.9 | $A_p$ = 16.6 | $B_p$ = 92.0 | $C_p$ = 264.0 |
| A cells = 7 | B cells = 6 | C cells = 3 | Vmax % = 72.8 | $A_p$ = 12.6 | $B_p$ = 97.8 | $C_p$ = 254.2 |
| A cells = 7 | B cells = 6 | C cells = 4 | Vmax % = 79.1 | $A_p$ = 8.6 | $B_p$ = 103.3 | $C_p$ = 249.8 |
| A cells = 7 | B cells = 6 | C cells = 5 | Vmax % = 84.9 | $A_p$ = 4.4 | $B_p$ = 108.8 | $C_p$ = 247.3 |
| A cells = 7 | B cells = 6 | C cells = 6 | Vmax % = 90.2 | $A_p$ = 0.0 | $B_p$ = 114.3 | $C_p$ = 245.7 |
| A cells = 7 | B cells = 7 | C cells = 0 | Vmax % = 57.7 | $A_p$ = 30.0 | $B_p$ = 90.0 | $C_p$ = 272.3 |
| A cells = 7 | B cells = 7 | C cells = 1 | Vmax % = 64.7 | $A_p$ = 25.8 | $B_p$ = 94.1 | $C_p$ = 240.0 |
| A cells = 7 | B cells = 7 | C cells = 2 | Vmax % = 71.4 | $A_p$ = 21.8 | $B_p$ = 98.2 | $C_p$ = 240.0 |
| A cells = 7 | B cells = 7 | C cells = 3 | Vmax % = 77.8 | $A_p$ = 17.6 | $B_p$ = 102.4 | $C_p$ = 240.0 |
| A cells = 7 | B cells = 7 | C cells = 4 | Vmax % = 83.9 | $A_p$ = 13.4 | $B_p$ = 106.6 | $C_p$ = 240.0 |
| A cells = 7 | B cells = 7 | C cells = 5 | Vmax % = 89.6 | $A_p$ = 9.1 | $B_p$ = 110.9 | $C_p$ = 240.0 |

FIG. 8F-2

| Original number of cells = 7 (continued) | | | | | |
|---|---|---|---|---|---|
| A cells = 7 | B cells = 7 | C cells = 6 | Vmax % = 95.0 | $A_p$ = 4.6 | $B_p$ = 115.4 | $C_p$ = 240.0 |
| A cells = 7 | B cells = 7 | C cells = 7 | Vmax % = 100.0 | $A_p$ = 0.0 | $B_p$ = 120.0 | $C_p$ = 240.0 |

FIG. 8F-3

Original number of cells = 8

| A cells | B cells | C cells | Vmax % | Ap | Bp | Cp |
|---|---|---|---|---|---|---|
| 1 | 1 | 0 | 7.2 | 30.0 | 90.0 | 272.3 |
| 1 | 1 | 1 | 12.5 | 0.0 | 120.0 | 240.0 |
| 2 | 1 | 1 | 12.5 | 0.0 | 60.0 | 300.0 |
| 2 | 2 | 0 | 14.4 | 30.0 | 90.0 | 272.3 |
| 2 | 2 | 1 | 20.2 | 15.5 | 104.5 | 240.0 |
| 2 | 2 | 2 | 25.0 | 0.0 | 120.0 | 240.0 |
| 3 | 2 | 0 | 28.3 | 30.0 | 101.4 | 258.6 |
| 3 | 3 | 1 | 21.7 | 20.4 | 90.0 | 272.3 |
| 3 | 3 | 2 | 27.6 | 10.5 | 99.6 | 240.0 |
| 3 | 3 | 3 | 32.9 | 0.0 | 109.5 | 240.0 |
| 4 | 2 | 2 | 37.5 | 0.0 | 120.0 | 240.0 |
| 4 | 3 | 1 | 25.0 | 16.1 | 60.0 | 300.0 |
| 4 | 3 | 2 | 26.1 | 7.2 | 76.2 | 315.8 |
| 4 | 4 | 3 | 35.8 | 0.0 | 96.2 | 260.7 |
| 4 | 4 | 0 | 41.1 | 30.0 | 108.2 | 251.8 |
| 4 | 4 | 1 | 28.9 | 22.8 | 90.0 | 272.3 |
| 4 | 4 | 2 | 34.9 | 15.5 | 97.2 | 240.0 |
| 4 | 3 | 3 | 40.5 | 8.0 | 104.5 | 240.0 |
| 4 | 4 | 4 | 45.5 | 0.0 | 112.0 | 240.0 |
| 4 | 3 | 2 | 50.0 | 6.5 | 120.0 | 240.0 |
| 5 | 4 | 3 | 31.9 | 0.0 | 67.6 | 304.9 |
| 5 | 4 | 1 | 43.2 | 18.9 | 93.6 | 266.4 |
| 5 | 5 | 2 | 33.4 | 11.6 | 79.6 | 316.1 |
| 5 | 5 | 3 | 43.1 | 5.9 | 93.9 | 262.1 |
| 5 | 5 | 4 | 48.8 | 0.0 | 102.8 | 252.8 |
| 5 | 5 | 0 | 53.8 | 30.0 | 111.3 | 248.7 |
| 5 | 5 | 1 | 36.1 | 24.3 | 90.0 | 272.3 |
| 5 | 5 | 2 | 42.2 | 18.5 | 95.7 | 240.0 |
| 5 | 5 | 3 | 47.9 | 12.5 | 101.5 | 240.0 |
| 5 | 5 | 4 | 53.2 | 6.4 | 107.5 | 240.0 |
| 5 | 5 | 5 | 58.0 | 0.0 | 113.6 | 240.0 |
| 6 | 5 | 3 | 62.5 | 0.0 | 120.0 | 240.0 |
| 6 | 3 | 3 | 37.5 | 0.0 | 60.0 | 300.0 |

FIG. 8G-1

Original number of cells = 8 (continued)

| | | | | | | | | | | | |
|---|---|---|---|---|---|---|---|---|---|---|---|
| A cells = 6 | B cells = 4 | C cells = 3 | Vmax % = 50.5 | $A_p$ = 4.8 | $B_p$ = 91.2 | $C_p$ = 268.4 |
| A cells = 6 | B cells = 4 | C cells = 4 | Vmax % = 56.6 | $A_p$ = 0.0 | $B_p$ = 101.4 | $C_p$ = 258.6 |
| A cells = 6 | B cells = 5 | C cells = 1 | Vmax % = 41.3 | $A_p$ = 20.5 | $B_p$ = 82.4 | $C_p$ = 311.3 |
| A cells = 6 | B cells = 5 | C cells = 2 | Vmax % = 50.4 | $A_p$ = 14.5 | $B_p$ = 92.7 | $C_p$ = 263.2 |
| A cells = 6 | B cells = 5 | C cells = 3 | Vmax % = 56.3 | $A_p$ = 9.8 | $B_p$ = 99.8 | $C_p$ = 253.6 |
| A cells = 6 | B cells = 5 | C cells = 4 | Vmax % = 61.6 | $A_p$ = 5.0 | $B_p$ = 106.5 | $C_p$ = 249.3 |
| A cells = 6 | B cells = 5 | C cells = 5 | Vmax % = 66.4 | $A_p$ = 0.0 | $B_p$ = 113.1 | $C_p$ = 246.9 |
| A cells = 6 | B cells = 6 | C cells = 0 | Vmax % = 43.3 | $A_p$ = 30.0 | $B_p$ = 90.0 | $C_p$ = 272.3 |
| A cells = 6 | B cells = 6 | C cells = 1 | Vmax % = 49.4 | $A_p$ = 25.2 | $B_p$ = 94.8 | $C_p$ = 240.0 |
| A cells = 6 | B cells = 6 | C cells = 2 | Vmax % = 55.2 | $A_p$ = 20.4 | $B_p$ = 99.6 | $C_p$ = 240.0 |
| A cells = 6 | B cells = 6 | C cells = 3 | Vmax % = 60.7 | $A_p$ = 15.5 | $B_p$ = 104.5 | $C_p$ = 240.0 |
| A cells = 6 | B cells = 6 | C cells = 4 | Vmax % = 65.8 | $A_p$ = 10.5 | $B_p$ = 109.5 | $C_p$ = 240.0 |
| A cells = 6 | B cells = 6 | C cells = 5 | Vmax % = 70.6 | $A_p$ = 5.4 | $B_p$ = 114.6 | $C_p$ = 240.0 |
| A cells = 6 | B cells = 6 | C cells = 6 | Vmax % = 75.0 | $A_p$ = 0.0 | $B_p$ = 120.0 | $C_p$ = 240.0 |
| A cells = 7 | B cells = 4 | C cells = 3 | Vmax % = 45.6 | $A_p$ = 4.6 | $B_p$ = 68.0 | $C_p$ = 299.9 |
| A cells = 7 | B cells = 4 | C cells = 4 | Vmax % = 57.7 | $A_p$ = 0.0 | $B_p$ = 89.0 | $C_p$ = 271.0 |
| A cells = 7 | B cells = 5 | C cells = 2 | Vmax % = 57.7 | $A_p$ = 8.2 | $B_p$ = 90.0 | $C_p$ = 270.0 |
| A cells = 7 | B cells = 5 | C cells = 3 | Vmax % = 64.1 | $A_p$ = 4.1 | $B_p$ = 98.2 | $C_p$ = 259.7 |
| A cells = 7 | B cells = 5 | C cells = 4 | Vmax % = 69.5 | $A_p$ = 0.0 | $B_p$ = 105.6 | $C_p$ = 254.4 |
| A cells = 7 | B cells = 6 | C cells = 1 | Vmax % = 47.9 | $A_p$ = 22.1 | $B_p$ = 83.0 | $C_p$ = 317.0 |
| A cells = 7 | B cells = 6 | C cells = 2 | Vmax % = 57.6 | $A_p$ = 16.6 | $B_p$ = 92.0 | $C_p$ = 264.0 |
| A cells = 7 | B cells = 6 | C cells = 3 | Vmax % = 63.7 | $A_p$ = 12.6 | $B_p$ = 97.8 | $C_p$ = 254.2 |
| A cells = 7 | B cells = 6 | C cells = 4 | Vmax % = 69.2 | $A_p$ = 8.6 | $B_p$ = 103.3 | $C_p$ = 249.8 |
| A cells = 7 | B cells = 6 | C cells = 5 | Vmax % = 74.3 | $A_p$ = 4.4 | $B_p$ = 108.8 | $C_p$ = 247.3 |
| A cells = 7 | B cells = 6 | C cells = 6 | Vmax % = 78.9 | $A_p$ = 0.0 | $B_p$ = 114.3 | $C_p$ = 245.7 |
| A cells = 7 | B cells = 7 | C cells = 0 | Vmax % = 50.5 | $A_p$ = 30.0 | $B_p$ = 90.0 | $C_p$ = 272.3 |
| A cells = 7 | B cells = 7 | C cells = 1 | Vmax % = 56.6 | $A_p$ = 25.9 | $B_p$ = 94.1 | $C_p$ = 240.0 |
| A cells = 7 | B cells = 7 | C cells = 2 | Vmax % = 62.5 | $A_p$ = 21.8 | $B_p$ = 98.2 | $C_p$ = 240.0 |
| A cells = 7 | B cells = 7 | C cells = 3 | Vmax % = 68.1 | $A_p$ = 17.6 | $B_p$ = 102.4 | $C_p$ = 240.0 |
| A cells = 7 | B cells = 7 | C cells = 4 | Vmax % = 73.4 | $A_p$ = 13.4 | $B_p$ = 106.6 | $C_p$ = 240.0 |
| A cells = 7 | B cells = 7 | C cells = 5 | Vmax % = 78.4 | $A_p$ = 9.1 | $B_p$ = 110.9 | $C_p$ = 240.0 |
| A cells = 7 | B cells = 7 | C cells = 6 | Vmax % = 83.1 | $A_p$ = 4.6 | $B_p$ = 115.4 | $C_p$ = 240.0 |
| A cells = 7 | B cells = 7 | C cells = 7 | Vmax % = 87.5 | $A_p$ = 0.0 | $B_p$ = 120.0 | $C_p$ = 240.0 |

FIG. 8G-2

Original number of cells = 8 (continued)

| | | | | | | | |
|---|---|---|---|---|---|---|---|
| A cells = 8 | B cells = 4 | C cells = 4 | Vmax % = 50.0 | $A_p$ = 0.0 | $B_p$ = 60.0 | $C_p$ = 300.0 |
| A cells = 8 | B cells = 5 | C cells = 3 | Vmax % = 50.7 | $A_p$ = 8.2 | $B_p$ = 68.4 | $C_p$ = 307.8 |
| A cells = 8 | B cells = 5 | C cells = 4 | Vmax % = 64.9 | $A_p$ = 3.6 | $B_p$ = 87.7 | $C_p$ = 272.8 |
| A cells = 8 | B cells = 6 | C cells = 2 | Vmax % = 52.1 | $A_p$ = 16.1 | $B_p$ = 76.2 | $C_p$ = 315.8 |
| A cells = 8 | B cells = 6 | C cells = 3 | Vmax % = 64.9 | $A_p$ = 10.8 | $B_p$ = 89.4 | $C_p$ = 271.2 |
| A cells = 8 | B cells = 6 | C cells = 4 | Vmax % = 71.5 | $A_p$ = 7.2 | $B_p$ = 96.2 | $C_p$ = 260.7 |
| A cells = 8 | B cells = 6 | C cells = 5 | Vmax % = 77.2 | $A_p$ = 3.7 | $B_p$ = 102.3 | $C_p$ = 255.2 |
| A cells = 8 | B cells = 6 | C cells = 6 | Vmax % = 82.3 | $A_p$ = 0.0 | $B_p$ = 108.2 | $C_p$ = 251.8 |
| A cells = 8 | B cells = 7 | C cells = 1 | Vmax % = 55.4 | $A_p$ = 23.1 | $B_p$ = 84.2 | $C_p$ = 315.3 |
| A cells = 8 | B cells = 7 | C cells = 2 | Vmax % = 64.9 | $A_p$ = 18.2 | $B_p$ = 91.5 | $C_p$ = 264.7 |
| A cells = 8 | B cells = 7 | C cells = 3 | Vmax % = 71.1 | $A_p$ = 14.7 | $B_p$ = 96.5 | $C_p$ = 254.7 |
| A cells = 8 | B cells = 7 | C cells = 4 | Vmax % = 76.7 | $A_p$ = 11.2 | $B_p$ = 101.2 | $C_p$ = 250.2 |
| A cells = 8 | B cells = 7 | C cells = 5 | Vmax % = 82.0 | $A_p$ = 7.6 | $B_p$ = 105.8 | $C_p$ = 247.6 |
| A cells = 8 | B cells = 7 | C cells = 6 | Vmax % = 86.9 | $A_p$ = 3.9 | $B_p$ = 110.4 | $C_p$ = 246.0 |
| A cells = 8 | B cells = 7 | C cells = 7 | Vmax % = 91.5 | $A_p$ = 0.0 | $B_p$ = 115.2 | $C_p$ = 244.9 |
| A cells = 8 | B cells = 8 | C cells = 0 | Vmax % = 57.7 | $A_p$ = 30.0 | $B_p$ = 90.0 | $C_p$ = 272.3 |
| A cells = 8 | B cells = 8 | C cells = 2 | Vmax % = 69.8 | $A_p$ = 22.8 | $B_p$ = 97.2 | $C_p$ = 240.0 |
| A cells = 8 | B cells = 8 | C cells = 3 | Vmax % = 75.5 | $A_p$ = 19.2 | $B_p$ = 100.8 | $C_p$ = 240.0 |
| A cells = 8 | B cells = 8 | C cells = 4 | Vmax % = 80.9 | $A_p$ = 15.5 | $B_p$ = 104.5 | $C_p$ = 240.0 |
| A cells = 8 | B cells = 8 | C cells = 5 | Vmax % = 86.1 | $A_p$ = 11.8 | $B_p$ = 108.2 | $C_p$ = 240.0 |
| A cells = 8 | B cells = 8 | C cells = 6 | Vmax % = 91.0 | $A_p$ = 8.0 | $B_p$ = 112.0 | $C_p$ = 240.0 |
| A cells = 8 | B cells = 8 | C cells = 7 | Vmax % = 95.7 | $A_p$ = 4.1 | $B_p$ = 115.9 | $C_p$ = 240.0 |
| A cells = 8 | B cells = 8 | C cells = 8 | Vmax % = 100.0 | $A_p$ = 0.0 | $B_p$ = 120.0 | $C_p$ = 240.0 |

FIG. 8G-3

APPARATUS AND METHODS FOR RESTORING POWER CELL FUNCTIONALITY IN MULTI-CELL POWER SUPPLIES

REFERENCE TO RELATED APPLICATIONS

This application claims the benefit of U.S. Provisional Patent Application Ser. No. 61/695,023, filed Aug. 30, 2012, which is incorporated by reference herein in its entirety for all purposes.

BACKGROUND

This invention relates to multi-cell power supplies. More particularly, this invention relates to apparatus and methods for restoring power cell functionality in multi-cell power supplies.

SUMMARY

In a first aspect of the invention, a method is provided for operating a multi-cell power supply that includes multiple series-connected power cells in each of multiple legs. Each power cell includes a bypass device that may be used to selectively bypass and de-bypass the power cell. After a first power cell faults and is bypassed as a result of the fault, the method includes de-bypassing the first power cell without stopping the multi-cell power supply if the first power cell fault was caused by a predetermined operating condition.

In a second aspect of the invention, a multi-cell power supply is provided that includes multiple series-connected power cells in each of multiple legs, and a controller. Each power cell includes a bypass device that may be used to selectively bypass and de-bypass the power cell. A first power cell faults and is bypassed as a result of the fault. The controller is configured to de-bypass the first power cell without stopping the multi-cell power supply if the first power cell fault was caused by a predetermined operating condition.

Other features and aspects of the present invention will become more fully apparent from the following detailed description, the appended claims and the accompanying drawings.

BRIEF DESCRIPTION OF THE DRAWINGS

Features of the present invention can be more clearly understood from the following detailed description considered in conjunction with the following drawings, in which the same reference numerals denote the same elements throughout, and in which:

FIGS. 8A-8G3 are example values of leg-to-leg phase relationships for multi-cell power supplies in accordance with this invention.

DETAILED DESCRIPTION

Apparatus and methods in accordance with this invention determine if a previously bypassed power cell of a multi-cell power supply may be de-bypassed. If the previously bypassed power cell may be de-bypassed, apparatus and methods in accordance with this invention de-bypass the previously bypassed power cell without stopping the multi-cell power supply.

Multi-cell power supplies, such as described in Hammond U.S. Pat. No. 5,625,545 (the "'545 patent"), Aiello et al. U.S. Pat. No. 6,014,323, Hammond U.S. Pat. No. 6,166,513, Rastogi et al. U.S. Pat. No. 7,508,147, and Hammond et al. U.S. Pat. No. 8,169,107, each of which is incorporated by reference herein in its entirety for all purposes, use modular power cells to deliver medium-voltage power to a load, such as a three-phase AC motor.

As used herein, a "medium voltage" is a voltage of greater than about 690V and less than about 69 kV, and a "low voltage" is a voltage less than about 690V. Persons of ordinary skill in the art will understand that other voltage levels may be specified as "medium voltage" and "low voltage." For example, in some embodiments, a "medium voltage" may be a voltage between about 1 kV and about 69 kV, and a "low voltage" may be a voltage less than about 1 kV.

Figure 1:
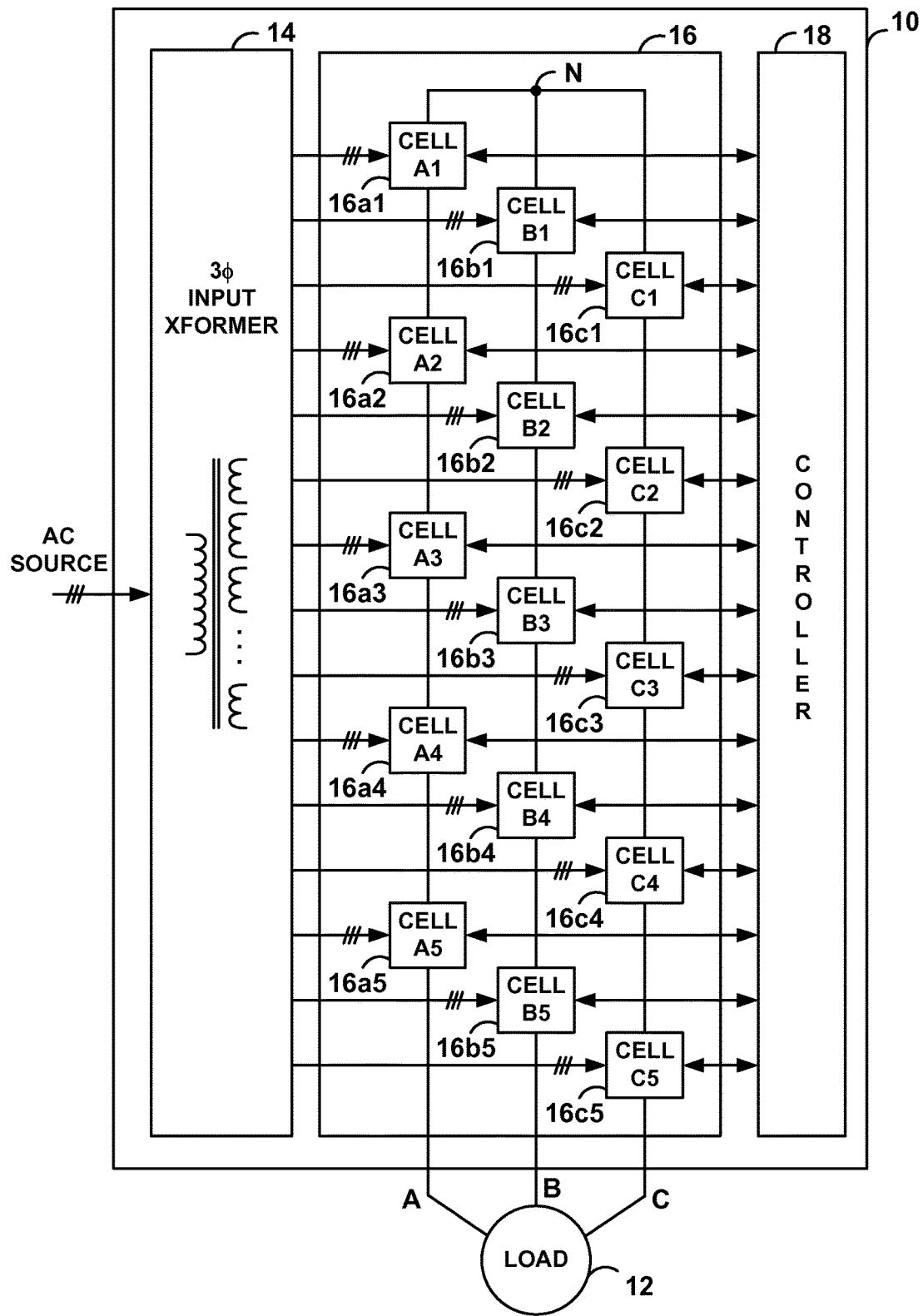
FIG. 1 is a block diagram of an example multi-cell power supply in accordance with this invention.

Referring now to FIG. 1, an example multi-cell power supply 10 in accordance with this invention is described. Multi-cell power supply 10 includes a transformer 14, a power circuit 16, and a controller 18. Multi-cell power supply 10 receives three-phase power from an AC source, and delivers three-phase power to a load 12 (e.g., a three-phase AC motor, or other similar load). Persons of ordinary skill in the art will understand that multi-cell power supplies in accordance with this invention may be used with AC sources that provide more or less than three power phases, and may deliver more or less than three power phases to load 12. In addition, persons of ordinary skill in the art will understand that multi-cell power supplies in accordance with this invention may include additional, fewer or different components than the ones shown in FIG. 1.

Transformer 14 may be a multiple winding three-phase isolation transformer, such as described in the '545 patent. Such a transformer may have a primary winding which is star or mesh connected, and which is energized from the three-phase AC Source. The transformer may then energize a number of single or multi-phase secondary windings. In example embodiments of this invention, transformer 14 includes a number of secondary windings, each corresponding to a respective power cell in power circuit 16. Persons of ordinary skill in the art will understand that other transformer configurations may be used, and that in some applications an isolation transformer need not be used.

As shown in FIG. 1, transformer 14 is coupled to power circuit 16, which includes fifteen power cells 16a1, 16a2, 16a3, . . . , 16c4, 16c5, which are configured to provide medium voltage output power on three output phases (also referred to herein as "legs") A, B and C to load 12. Each leg A, B, C is fed by a group of series-coupled power cells 16a1, 16b1, . . . , 16c5.

In particular, leg A includes five series-coupled power cells 16a1, 16a2, 16a3, 16a4 and 16a5, leg B includes five series-coupled power cells 16b1, 16b2, 16b3, 16b4 and 16b5, and leg C includes five series-coupled power cells 16c1, 16c2, 16c3, 16c4 and 16c5. Persons of ordinary skill in the art will understand that power circuit 16 may include more or less than three legs, and that each leg may include more or less than five power cells.

The output voltage of each leg A, B and C is the sum of the output voltages of the power cells in the leg. For example, if power cells 16a1, 16b1, . . . , 16c5 each have a maximum output voltage magnitude of about 480V, each leg of power circuit 16 can produce a maximum output voltage magnitude of about 2400V above neutral.

As shown in FIG. 1, each of power cells 16a1, 16b1, . . . , 16c5 is coupled to controller 18, which uses current feedback and voltage feedback (not shown) to control the operation of power cells 16a1, 16b1, . . . , 16c5. Controller 18 may be a microprocessor, such as a TMS320F2801 processor by Texas Instruments, Dallas, Tex., a Programmable Gate Array device (such as FPGA from Altera or Xilinx) that can be configured to perform the functions of a processor, or other similar processor or circuit.

Figure 2A:
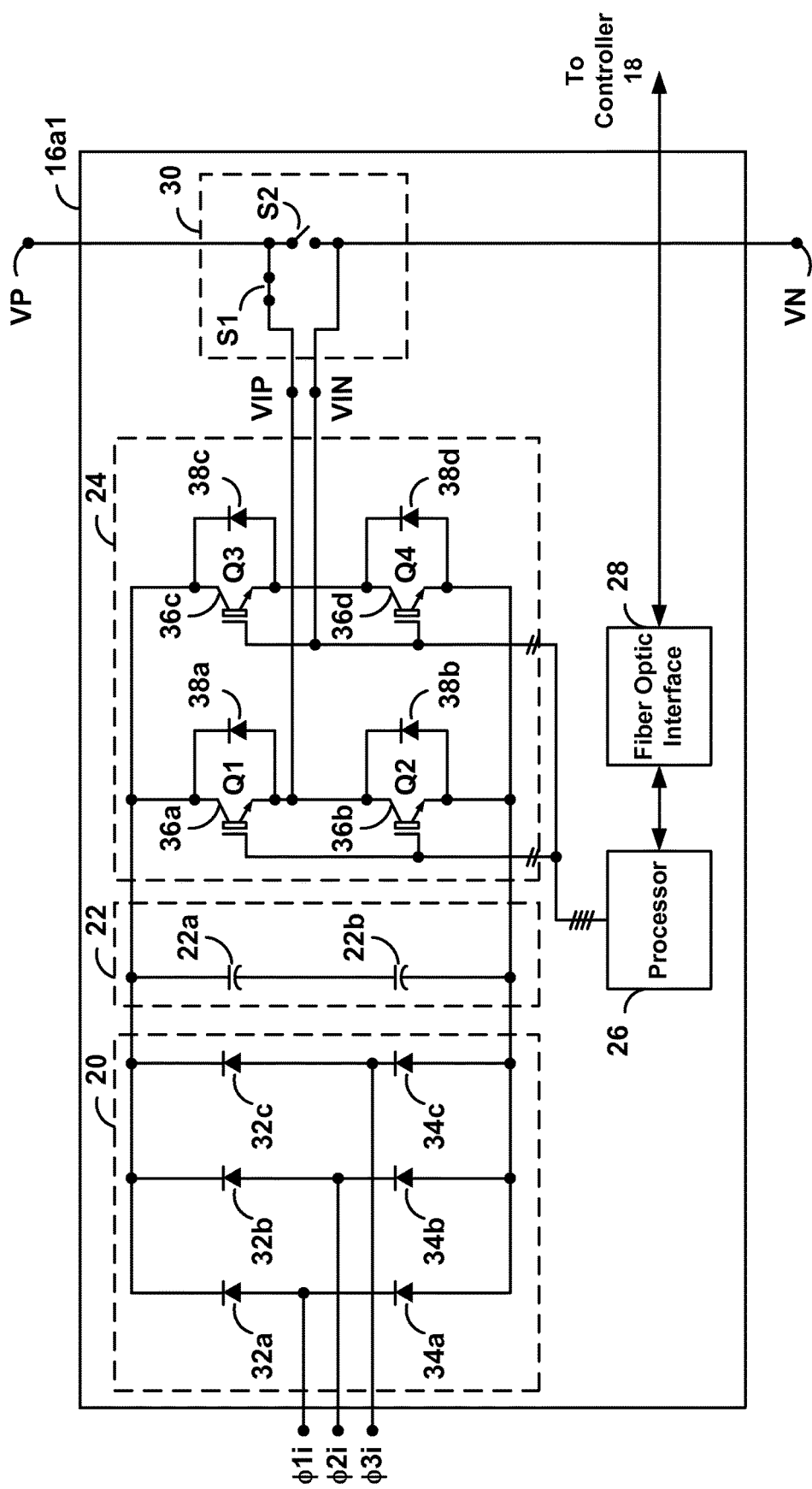
FIG. 2A is a block diagram of an example power cell in accordance with this invention.

Referring now to FIG. 2A, an example power cell (e.g., power cell 16a1) in accordance with this invention is described. Power cell 16a1 converts a three-phase AC input signal at input terminals φ1i, φ2i, φ3i to a single phase AC output signal at output terminals VP and VN. In particular, power cell 16a1 includes a rectifier 20, a DC bus capacitor 22 (which may include capacitors 22a and 22b), an inverter 24, a processor 26, a fiber optic interface 28 and a bypass device 30. Persons of ordinary skill in the art will understand that power cells in accordance with this invention may include additional, fewer, or different components than the components illustrated in FIG. 2A. In addition, persons of ordinary skill in the art will understand that power cells in accordance with this invention may include four-quadrant ("4-Q") power cells, as are known in the art.

Rectifier 20 includes diodes 32a, 32b, 32c and 34a, 34b, 34c coupled to input terminals φ1i, φ2i, φ3i, and converts a three-phase AC input signal to a substantially constant DC voltage coupled to DC bus capacitors 22a and 22b. Persons of ordinary skill in the art will understand that DC bus capacitors 22a and 22b may include a capacitor bank, and that the specific amount of capacitance necessary depends on each particular application.

Inverter 24 converts the DC voltage across DC bus capacitors 22a and 22b to an AC output at inverter output terminals VIP and VIN. Inverter 24 may be a bridge converter that includes semiconductor switches 36a, 36b, 36c and 36d, and diodes 38a, 38b, 38c and 38d. Semiconductor switches 36a, 36b, 36c and 36d may be any suitable switch element, such as isolated-gate bipolar transistors ("IGBTs"), or other similar switch element. Depending on the power level, various solid-state components may be chosen. As shown in FIG. 2A, diodes 38a, 38b, 38a and 38d are configured across corresponding semiconductor switches 36a, 36b, 36c and 36d, respectively.

Semiconductor switches 36a, 36b, 36c and 36d are coupled to processor 26, which uses pulse-width modulation ("PWM") to selectively apply DC power to inverter outputs VIP and VIN. In such a PWM operation, switches 36a, 36b, 36c and 36d can be considered either fully ON or fully OFF as they operate. Persons of ordinary skill in the art will understand that inverter 24 may have topologies other than the bridge converter shown in FIG. 2A, and may use control modes other than PWM.

Processor 26 may be coupled to controller 18 via fiber optic interface 28. Processor 26 may be a TMS320F2801 processor, or may be any other similar processor. Fiber optic interface 28 may be an AFBR 2624Z/AFBR 1624Z fiber optic receiver/transmitter pair, or may be any other similar fiber optic interface. Processor 26 may communicate status information regarding power cell 16a1 to controller 18, and controller 18 may communicate control signals to processor 26 to control operation of power cell 16a1.

Bypass device 30 is coupled between inverter output terminals VIP and VIN and power cell output terminals VP and VN. Bypass device 30 may be a mechanical, electrical, or a combination mechanical and electrical device that may be selectively switched between a first configuration and a second configuration. Bypass device 30 may include a magnetic contactor, a spring-loaded contact, a pair of antiparallel silicon controlled rectifiers, or a pair of series transistors, such as described in FIG. 1D and the accompanying text of Hammond et al. U.S. Pat. No. 5,986,909 (the "'909 patent"), which is incorporated by reference herein in its entirety for all purposes. Persons of ordinary skill in the art will understand that other circuits and/or devices may be used for bypass device 30.

In the example embodiment shown in FIG. 2A, bypass device 30 includes a first switch S1 and a second switch S2. First switch S1 and second switch S2 may be selectively opened and closed based on control signals (not shown) provided by processor 26. Persons of ordinary skill in the art will understand that alternative embodiments of this invention may include a bypass device that uses a single switch. As shown in FIG. 2A, bypass device 30 is in a first configuration, with first switch S1 closed and second switch S2 open, and inverter output terminals VIP and VIN coupled to power cell output terminals VP and VN, respectively. In the first configuration, current is conducted by power cell 16a1, and power cell 16a1 is "not-bypassed."

Figure 2B:
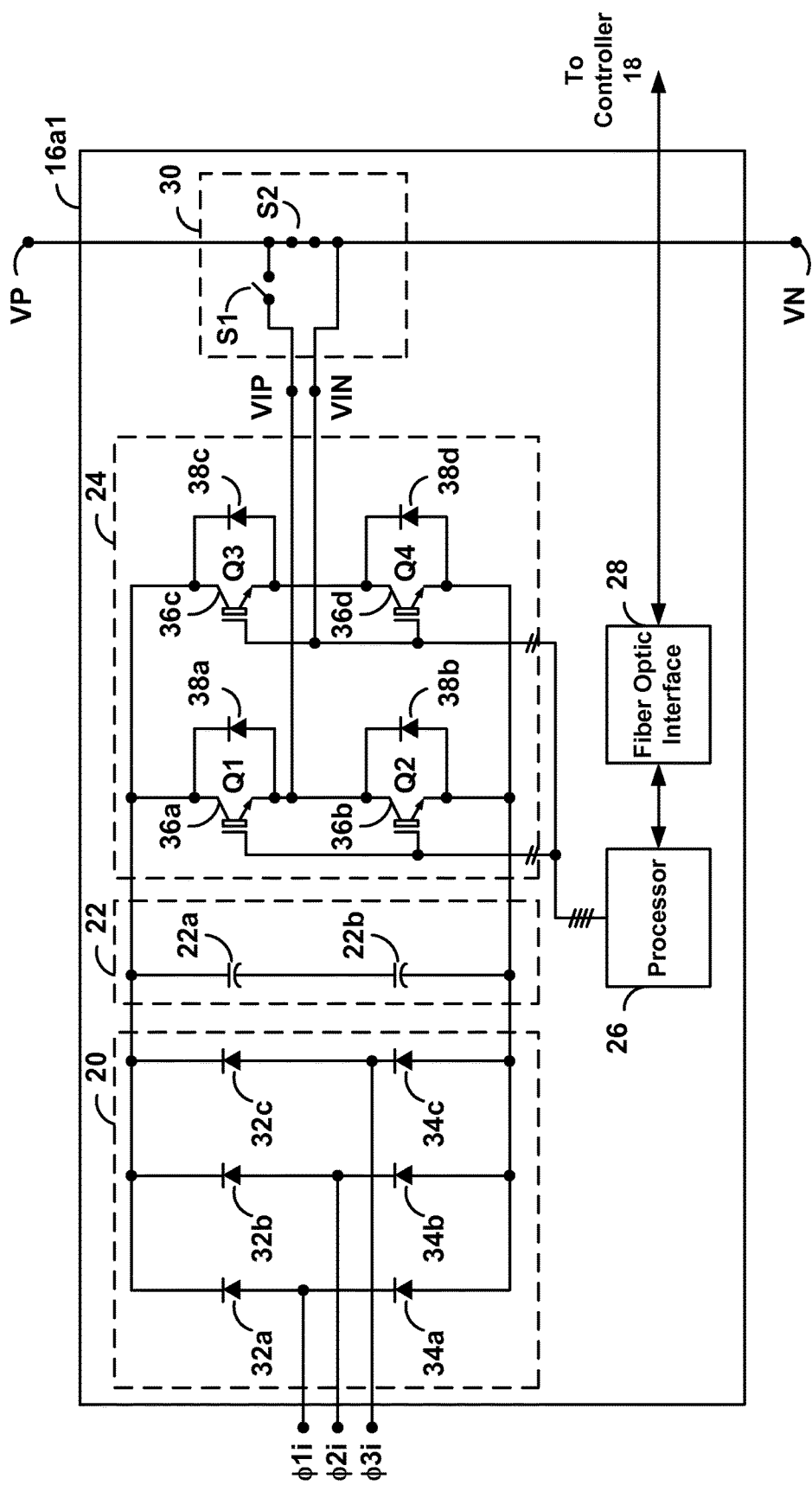
FIG. 2B is another block diagram of the example power cell of FIG. 2A.

In contrast, FIG. 2B illustrates bypass device 30 in a second configuration, with first switch S1 open and second switch S2 closed, forming a shunt path between output terminals VP and VN of power cell 16a1. In the second configuration, current is conducted through bypass device 30 instead of power cell 16a1, and power cell 16a1 is "bypassed." Thus, bypass device 30 may be used to selectively bypass and not-bypass (or "de-bypass") power cell 16a1.

Figure 3A:
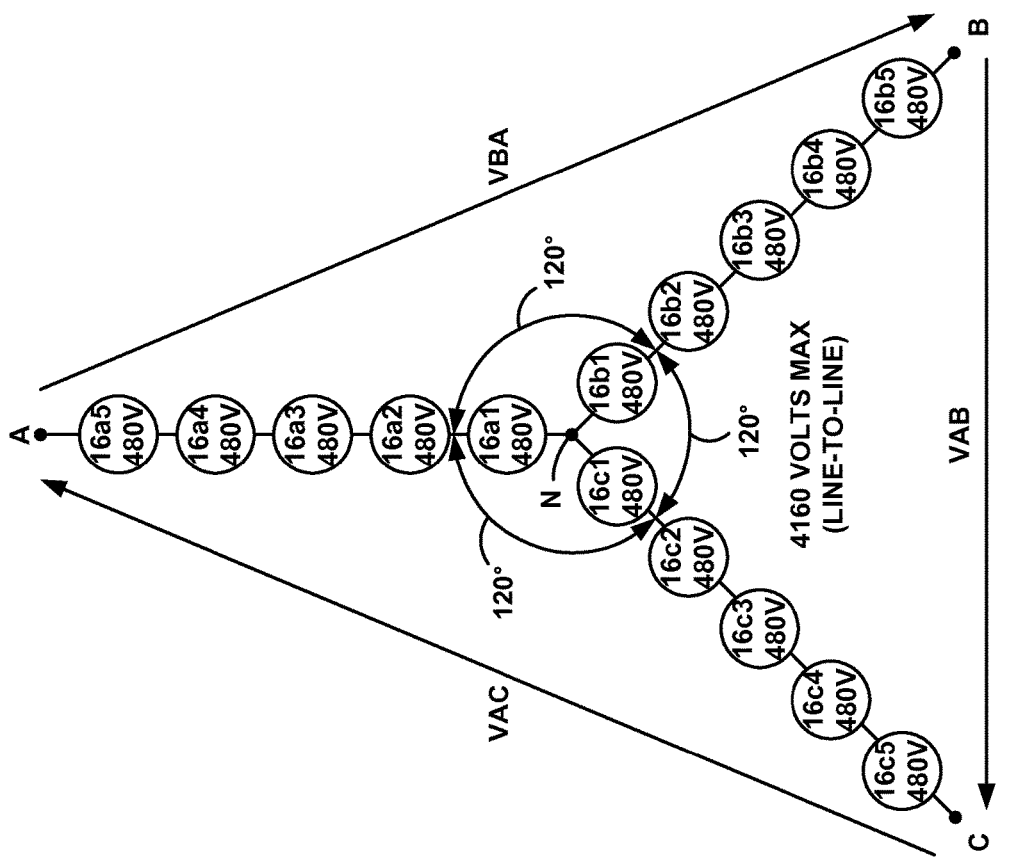
FIGS. 3A-3B are example voltage diagrams of an array of series-connected power cells in accordance with this invention.

Referring again to FIG. 1, during normal operation, each of power cells 16a1, 16a2, 16a3, . . . 16c4, and 16c5 is operational and not bypassed, and the output voltage of each leg A, B, C is the sum of the output voltages of all five power cells in the leg. For example, FIG. 3A illustrates an array of series-connected power cells 16a1, 16a2, 16a3, . . . 16c4, and 16c5 that illustrate the voltages from each leg and the phase displacement between legs. In this illustrated example, each power cell 16a1, 16a2, 16a3, . . . 16c4, and 16c5 is capable of generating an AC output voltage of 480V. Persons of ordinary skill in the art will understand that power cell 16*a*1, 16*a*2, 16*a*3, . . . 16*c*4, and 16*c*5 may provide other AC output voltages.

In the illustrated drawing, each power cell 16*a*1, 16*a*2, 16*a*3, . . . 16*c*4, and 16*c*5 is represented by a circle, with five cells connected in each leg between neutral point N and the respective points A, B and C. As shown, such a multi-cell power supply can typically generate up to approximately 2400V from point N to each of points A, B and C. If controller 18 makes these three voltages equal in magnitude and mutually phase displaced by 120°, then the array will produce a balanced three-phase AC output voltage. In this case, the maximum available line-to-line output voltage (e.g., VAC, VBA, VCB) from the array shown in FIG. 3A is 4160V.

From time to time one or more of power cells 16*a*1, 16*a*2, 16*a*3, . . . 16*c*4, and 16*c*5 may fault, and the faulted power cells may be bypassed, e.g., using the corresponding bypass device 30 shown in FIGS. 2A-2B. Under such circumstances, the voltages from point N to each of points A, B and C typically will no longer be equal in magnitude. For example, if power cells 16*a*4 and 16*a*5 in FIG. 3A fault and are bypassed, but all other power cells are fully functional, leg A can produce a maximum output voltage magnitude of only about 1440V above neutral, whereas legs B and C still can produce a maximum output voltage magnitude of about 2400V above neutral.

As is known in the art, various techniques may be used to reconfigure the operation of multi-cell power supply 10 when one or more power cells are bypassed. For example, the '909 patent describes methods for reconfiguring the operation of a multi-cell power supply such that all not-bypassed power cells may be used to contribute to a balanced output voltage. In particular, by temporarily inhibiting normal operation of the multi-cell power supply, modifying the phase angles between phases A, B and C, and resuming operation of the multi-cell power supply using the modified phase angles, all not-bypassed power cells can be used to provide line-to-line voltages VAC, VBA, VCB having equal magnitudes, and having a mutual phase displacement of 120° between VAC, VBA, and VCB.

Figure 3B:
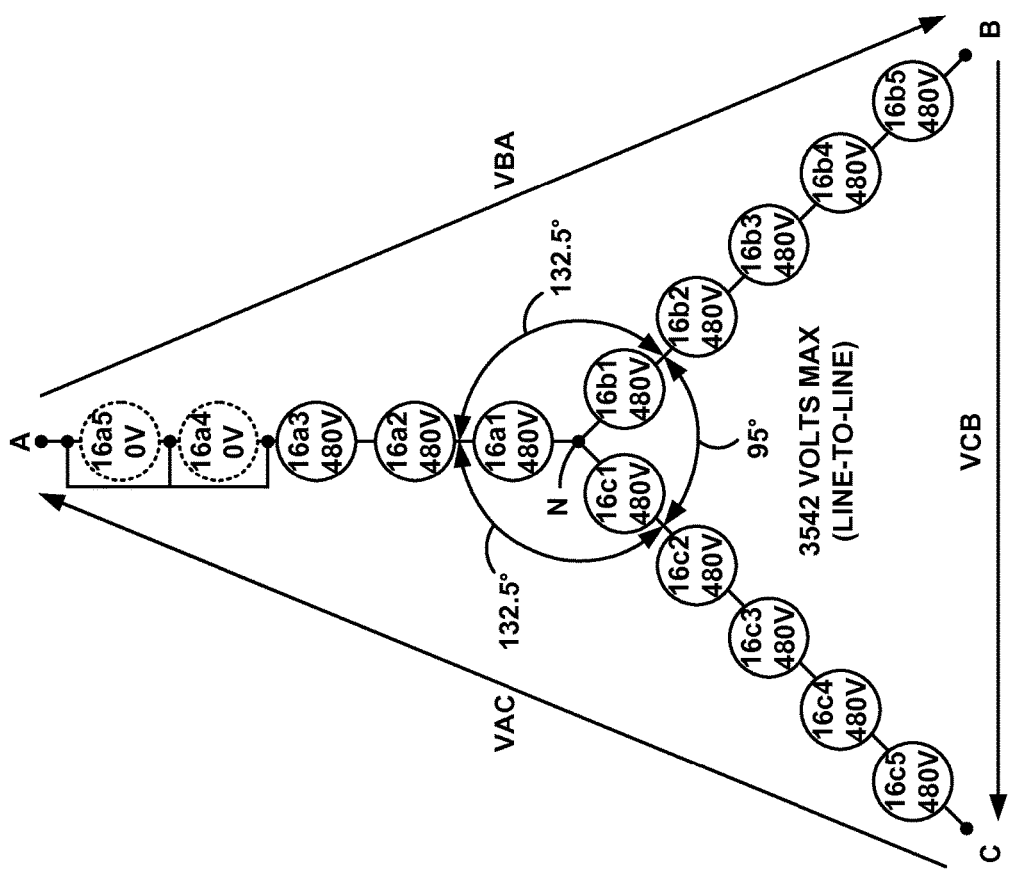

For example, as shown in FIG. 3B, if power cells 16*a*4 and 16*a*5 fault and are bypassed, but all other power cells remain fully functional, the phase angle between phases B and C may be reduced to 95°, and the phase angles between phases A and C and between A and B may be increased to 132.5°, which will produce line-to-line voltages VAC, VBA, and VCB having equal magnitudes of 3542V, and a mutual phase displacement of 120° between VAC, VBA, and VCB.

Although multi-cell power supplies may remain operational with some power cells bypassed, it is preferable that all power cells be restored to service. In some instances, a power cell may be bypassed as a result of a temporary operating condition (e.g., a momentary ambient temperature increase) that causes a power cell to fault. If the power cell is otherwise healthy, and if the operating condition that triggered the fault no longer exists, it is preferable to de-bypass the previously bypassed power cell.

Conventionally, bypassed power cells could be de-bypassed only by stopping the multi-cell power supply (and thereby completely shutting down power to and halting operation of the load), disengaging the bypass in the affected power cells, and then restarting the multi-cell power supply. Such stopping and restarting procedures are time consuming, however, and negatively impact the efficiency of equipment and processes being driven by the load.

In accordance with this invention, under certain predetermined circumstances, previously bypassed power cells of a multi-cell power supply may be de-bypassed without stopping the multi-cell power supply. In particular, a previously bypassed power cell may be tested to determine if: (a) the operating condition that caused the power cell fault is one of a predetermined number of operating conditions, (b) the operating condition no longer exists, and/or (c) the bypassed power cell is otherwise functional. Based on the test results, the previously bypassed power cell may be de-bypassed. As described in more detail below, in accordance with this invention, the previously bypassed power cell may be de-bypassed without stopping the multi-cell power supply.

Figure 4A:
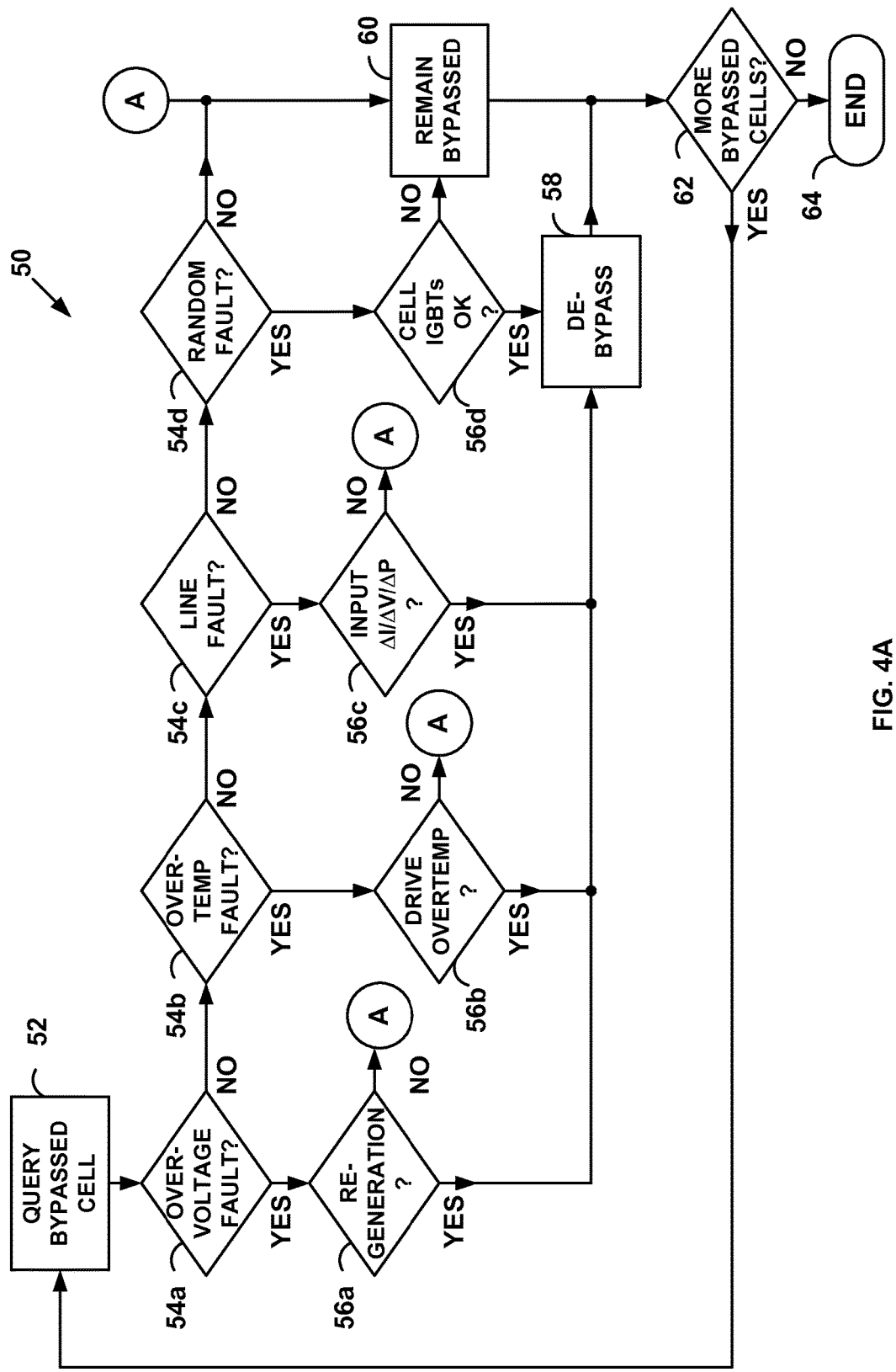
FIG. 4A is a flow diagram of an example method in accordance with this invention for determining if a previously bypassed power cell may be de-bypassed.

Referring now to FIG. 4A, an example method 50 of this invention is described for determining whether one or more of previously bypassed power cells 16*a*1, 16*a*2, 16*a*3, . . . 16*c*4, and 16*c*5 may be de-bypassed. Method 50 may be implemented in hardware, software or a combination of hardware and software, such as on controller 18, or other processor.

Figure 5:
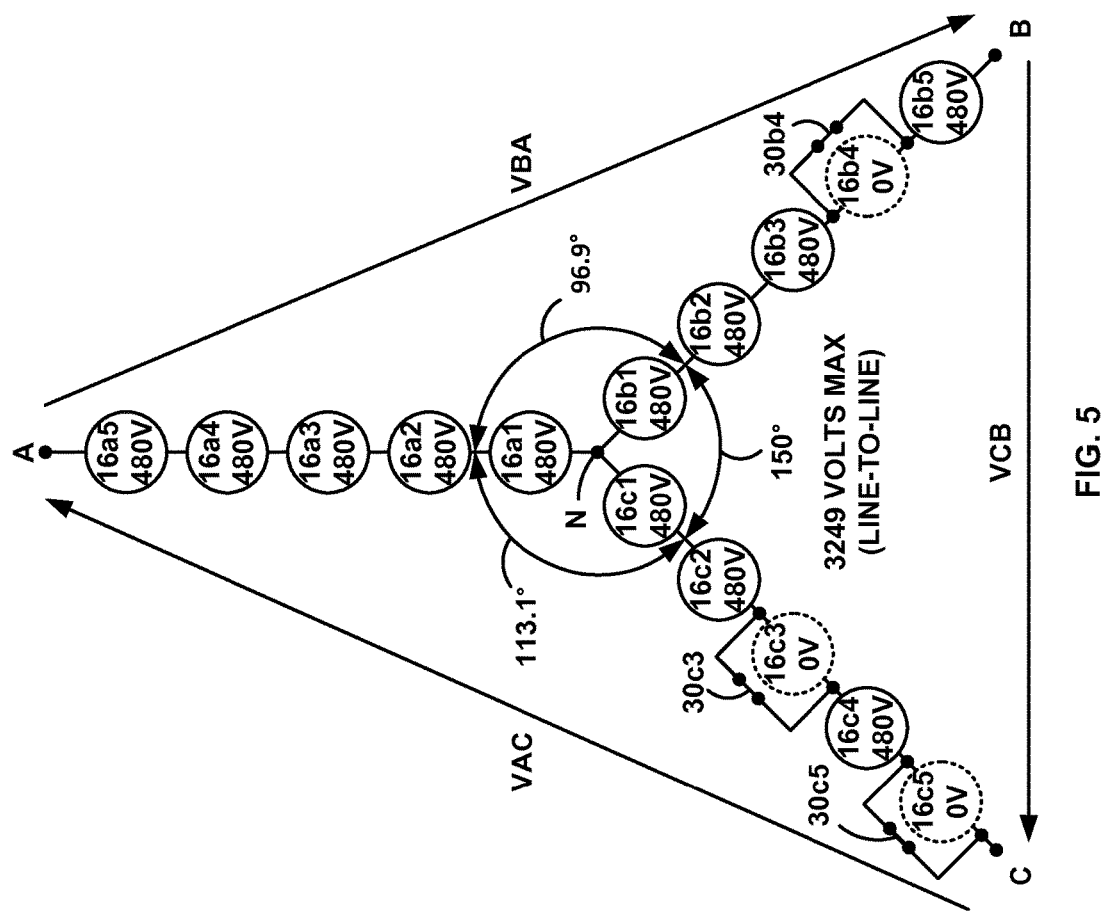
FIG. 5 is an another example voltage diagram of an array of series-connected power cells in accordance with this invention.

FIG. 5 will be used to illustrate the operation of method 50. In particular, FIG. 5 illustrates an array of series-connected power cells 16*a*1, 16*a*2, 16*a*3, . . . , 16*c*4, 16*c*5 in which power cells 16*b*4, 16*c*3 and 16*c*5 have previously faulted and are bypassed (e.g., bypass devices 30*b*4, 30*c*3 and 30*c*5 of power cells 16*b*4, 16*c*3 and 16*c*5, respectively, are all engaged), all remaining power cells are operational, and the phase angles between phases A, B and C, have been adjusted to provide line-to-line voltages VAC, VBA, VCB having equal magnitudes of 3249V, and having a mutual phase displacement of 120° between VAC, VBA, and VCB.

Referring again to FIG. 4A, beginning at step 52, a faulted and bypassed power cell (e.g., power cell 16*b*4) is queried to determine if the power cell can report the operating conditions that caused the fault. For example, processor 26 of power cell 16*b*4 may monitor a variety of operating conditions (e.g., DC bus voltage, operating temperature(s), input voltage, input current, IGBT state, arc detection, or other similar operating conditions) of power cell 16*b*4, and may report the operating conditions via fiber optic interface 28 in response to a query from controller 18.

Based on the response to the query, controller 18 determines if the bypassed power cell experienced one or more predetermined operating conditions that caused the power cell fault. For example, at steps 54*a*-54*d*, controller 18 determines if the reported operating conditions indicate that power cell 16*b*4 experienced an overvoltage fault, an over-temperature fault, a line fault, or a random fault, respectively.

An overvoltage fault may be indicated if the DC bus voltage of power cell 16*b*4 exceeds a predetermined threshold. An over-temperature fault may be indicated if a monitored temperature of power cell 16*b*4 exceeds a predetermined threshold. For 4-Q power cells, a line fault may be indicated if excessive input current existed due to a line dip. A random fault may be any fault condition other than the specific fault conditions identified above. Persons of ordinary skill in the art will understand that controller 18 may determine if the reported operating conditions indicate that the faulted power cell experienced additional, fewer or alternative fault conditions than the predetermined faults described above.

Thus, at step 54*a*, if the reported operating conditions indicate that power cell 16*b*4 experienced an overvoltage fault, the process proceeds to step 56*a*, and controller 18 determines if the overvoltage fault was the result of regeneration. If multi-cell power supply 10 absorbs regenerative power from load 12, the DC bus voltage of all non-bypassed power cells increases. As a result, the most sensitive power cell will fault (e.g., power cell 16b4).

When such an overvoltage fault occurs, multi-cell power supply 10 will temporarily inhibit normal operation, bypass faulted power cell 16b4, modify the phase angles between phases A, B and C, and resume operation of multi-cell power supply 10 (assuming that the remaining non-bypassed power cells do not similarly experience an overvoltage fault) using the modified phase angles as described above. While multi-cell power supply 10 is temporarily inhibited, the remaining non-bypassed power cells will cease acceptance of regenerative power, which will cause the DC bus voltage to drop. Multi-cell power supply 10 will resume operation, but faulted power cell 16b4 remains bypassed.

If such an overvoltage fault was not a result of a defective power cell (e.g., one that should remain bypassed until it can be replaced), but instead resulted because multi-cell power supply 10 absorbed regenerative power from load 12, bypassed power cell 16b4 may be de-bypassed.

Thus, at step 56a, controller 18 determines if multi-cell power supply 10 absorbed regenerative power from load 12 prior to the overvoltage fault of power cell 16b4. For example, controller 18 may query all other non-bypassed power cells 16a1, 16a2, 16a3, . . . , 16c2, and 16c4 to determine if those power cells also experienced increased DC bus voltages prior to the fault of power cell 16b4. Alternatively, or additionally, controller 18 may determine if multi-cell power supply 16 absorbed power from load 12 prior to the fault on power cell 16b4.

If either or both tests indicated that multi-cell power supply 10 absorbed regenerative power from load 12 prior to the overvoltage fault of power cell 16b4, the process proceeds to step 58 to de-bypass power cell 16b4. If one or both test fail to indicate regeneration, the process proceeds to step 60 to continue bypassing power cell 16b4.

Referring again to step 54a, if the reported operating conditions indicate that power cell 16b4 did not experience an overvoltage fault, the process proceeds to step 54b, and controller 18 determines if the reported operating conditions indicate that power cell 16b4 experienced an over-temperature fault.

If multi-cell power supply 10 temporarily overheats, the most sensitive power cell typically will fault (e.g., power cell 16b4). As a result, multi-cell power supply 10 will temporarily inhibit normal operation, bypass faulted power cell 16b4, modify the phase angles between phases A, B and C, and resume operation of multi-cell power supply 10 (assuming that the remaining non-bypassed power cells do not experience an over-temperature fault) using the modified phase angles as described above.

If such an over-temperature fault was not a result of a defective power cell (e.g., one that should remain bypassed until it can be replaced), but instead resulted because multi-cell power supply 10 temporarily overheated, and if power cell 16b4 has subsequently cooled, bypassed power cell 16b4 may be de-bypassed.

Thus, at step 56b, controller 18 determines if multi-cell power supply 10 temporarily overheated prior to the over-temperature fault of power cell 16b4. For example, controller 18 may query all of the power cells 16a1, 16a2, 16a3, . . . , 16c2, and 16c4 to determine if the power cells experienced an increase in temperature prior to the fault of power cell 16b4, and are no longer at an increased operating temperature.

If the test indicates that multi-cell power supply 10 temporarily overheated prior to the over-temperature fault of power cell 16b4, and that all power cells are no longer at an increased operating temperature, the process proceeds to step 58 to de-bypass power cell 16b4. If the test fails to indicate temporary overheating, the process proceeds to step 60 to continue bypassing power cell 16b4.

Referring again to step 54b, if the reported operating conditions indicate that power cell 16b4 did not experience an over-temperature fault, the process proceeds to step 54c, and controller 18 determines if the reported operating conditions indicate that power cell 16b4 experienced a line fault.

If a line disturbance occurs on the AC Source that drives multi-cell power supply 10, the most sensitive power cell typically will fault (e.g., power cell 16b4). As a result, multi-cell power supply 10 will temporarily inhibit normal operation, bypass faulted power cell 16b4, modify the phase angles between phases A, B and C, and resume operation of multi-cell power supply 10 (assuming that the remaining non-bypassed power cells do not similarly experience a line fault) using the modified phase angles as described above.

If such a line fault was not a result of a defective power cell (e.g., one that should remain bypassed until it can be replaced), but instead resulted because multi-cell power supply 10 experienced a temporary line disturbance, bypassed power cell 16b4 may be de-bypassed.

Thus, at step 56c, controller 18 determines if multi-cell power supply 10 experienced a temporary line disturbance prior to the line fault of power cell 16b4. For example, controller 18 may monitor the input current, input voltage and/or input power flow to multi-cell power supply 10 to check for excursions prior to the fault of power cell 16b4.

If the test indicates that prior to the fault of power cell 16b4, the input voltage varied greatly from nominal, or the input current changed by more than what could be produced by a single power cell, or if the input power changed by more than what could be produced by a single power cell, the process proceeds to step 58 to de-bypass power cell 16b4. If the test fails to indicate such input current, input voltage or input power excursions, the process proceeds to step 60 to continue bypassing power cell 16b4.

Referring again to step 54c, if the reported operating conditions indicate that power cell 16b4 did not experience a line disturbance, the process proceeds to step 54d, and controller 18 determines if power cell 16b4 experienced a temporary random fault, but is otherwise functional. If the fault of power cell 16b4 was not a result of a defective power cell (e.g., one that should remain bypassed until it can be replaced), but instead resulted from some random reason, bypassed power cell 16b4 may be de-bypassed.

Thus, at step 56d, controller 18 determines if power cell 16b4 is functional. For example, while power cell 16b4 remains bypassed, controller 18 may test the voltage blocking capability of semiconductor switches 36a, 36b, 36c and 36d of inverter 24 of power cell 16b4 to determine if the switches are functioning properly.

For example, referring to FIG. 2A, a resistor and opto-coupler (not shown) may be placed in parallel with each of semiconductor switches 36a, 36b, 36c and 36d to monitor the voltage across each switch. Controller 18 (via processor 26) may then turn OFF each of semiconductor switches 36a, 36b, 36c and 36d to determine if all four switches effectively block voltage, and then individually turn ON semiconductor switches 36a, 36b, 36c and 36d to determine if each switch conducts when requested.

Referring again to FIG. 4A, if all semiconductor switches 36a, 36b, 36c and 36d block voltage when turned OFF, and conduct current when turned ON, the process proceeds to step 58 to de-bypass power cell 16b4. If the test indicates that any of semiconductor switches 36a, 36b, 36c and 36d fail to properly turn OFF and ON, the process proceeds to step 60 to continue bypassing power cell 16b4.

Following steps 58 and 60, the process proceeds to step 62 to determine if any additional power cells 16a1, 16a2, 16a3, . . . , 16c2, and 16c4 have been bypassed (e.g., power cells 16c3 and 16c5 in FIG. 5). If additional power cells have been bypassed, the process returns to step 52, and determines if the additional faulted power cell experienced one or more predetermined fault conditions.

Persons of ordinary skill in the art will understand that the sequence of steps 54a-54d may be rearranged in any sequence. In addition, persons of ordinary skill in the art will understand that example processes in accordance with this invention may test more than one faulted power cell at a time, and may de-bypass more than one faulted power cell at a time.

Figure 4B:
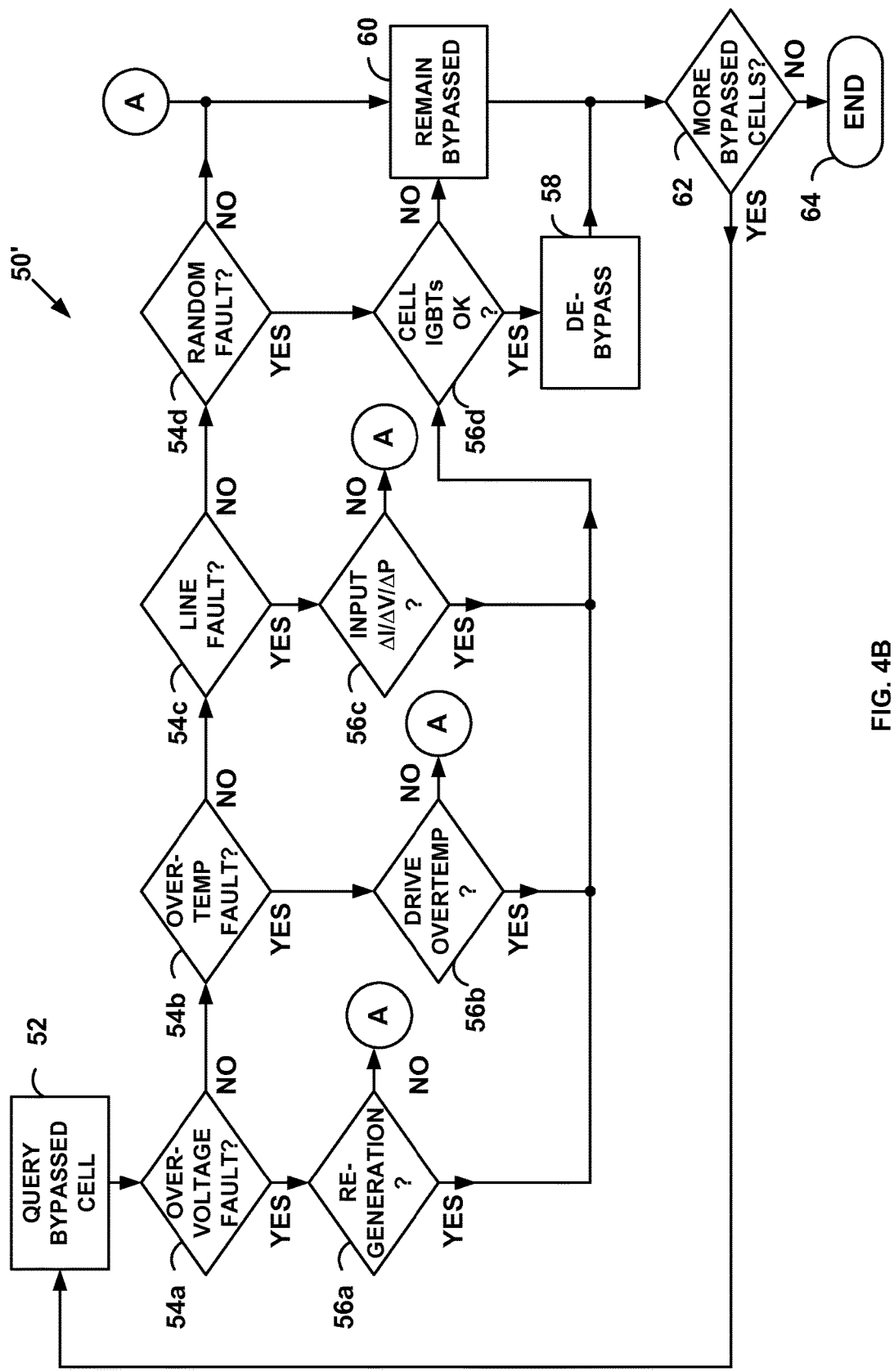
FIG. 4B is a flow diagram of an alternative example method in accordance with this invention for determining if a previously bypassed power cell may be de-bypassed.

In addition, as shown in FIG. 4B, in an alternative example process 50', step 56d (determining if all semiconductor switches 36a, 36b, 36c and 36d block voltage when turned OFF, and conduct current when turned ON) may be implemented in all instances prior to de-bypassing a power cell without stopping multi-cell power supply 10. This may serve as an additional safeguard to confirm that power cells that have faulted as a result of regeneration, temporary over-heating and/or line disturbances may safely be de-bypassed.

Figure 6:
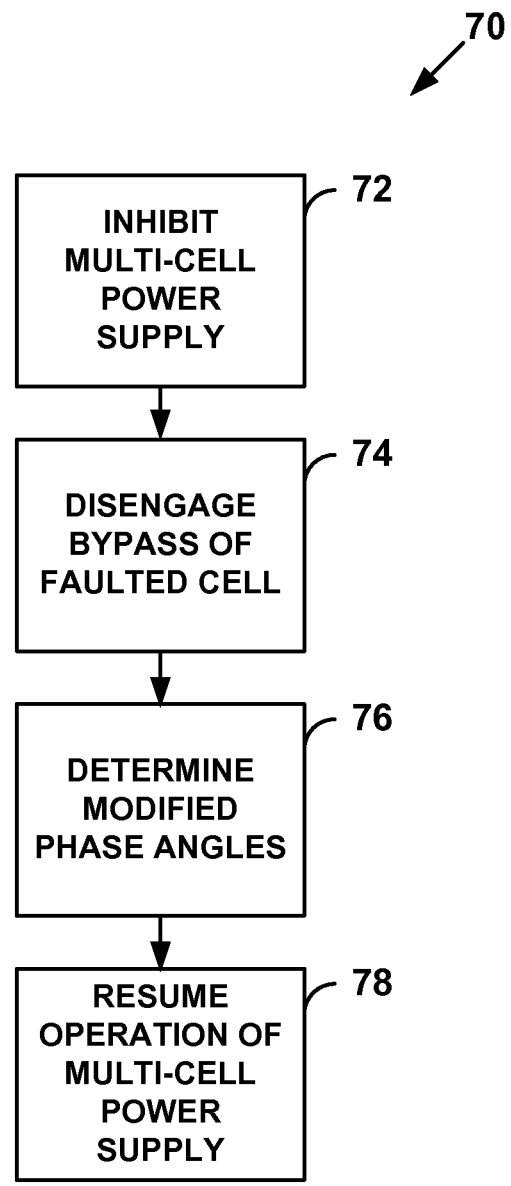
FIG. 6 is an example de-bypass method in accordance with this invention.

As described above in FIGS. 4A and 4B, at step 58, a previously bypassed power cell may be de-bypassed. Referring now to FIG. 6, an example process 70 in accordance with this invention is described for de-bypassing a previously bypassed power cell without stopping multi-cell power supply 10.

Beginning at step 72, the operation of multi-cell power supply 10 is temporarily inhibited. For example, referring to FIGS. 1 and 2, controller 18 may inhibit operation of multi-cell power supply 10 by inhibiting gating signals to semiconductor switches 36a, 36b, 36c and 36d of each inverter 24 of each of power cells 16a1, 16a2, 16a3, . . . , 16c4, 16c5. By doing so, semiconductor switches 36a, 36b, 36c and 36d of multi-cell power supply 10 stop switching, and no voltage is supplied to load 12 by multi-cell power supply 10.

Figure 7A:
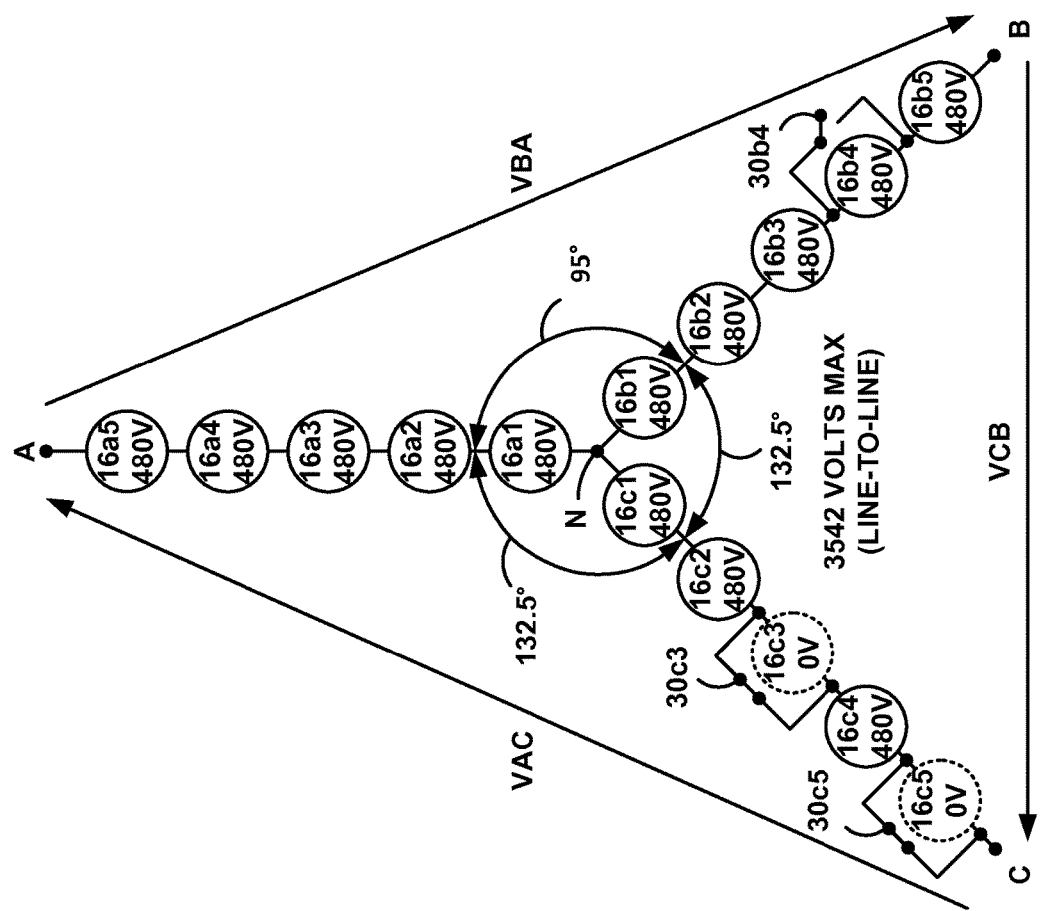
FIG. 7A is an example voltage diagram of an array of series-connected power cells in which a first power cell is de-bypassed in accordance with this invention.

Referring again to FIG. 6, at step 74, bypass device 30 of the faulted power cell (e.g., power cell 16b4) is reconfigured to de-bypass power cell 16b4, thus reconfiguring the array of series-connected power cells 16a1, 16a2, 16a3, . . . , 16c4, 16c5. For example, FIG. 7A illustrates an array of series-connected power cells 16a1, 16a2, 16a3, . . . , 16c4, 16c5 in which bypass device 30b4 is reconfigured to de-bypass power cell 16b4.

Referring again to FIG. 6, at step 76, modified phase angles between phases A, B and C are determined for the reconfigured array of series-connected power cells 16a1, 16a2, 16a3, . . . , 16c4, 16c5. As described in the '909 patent, the required phase angles between phases A, B and C depend on the number of functional power cells in each phase. For example, controller 18 may calculate specific phase angles for each configuration of the array of series-connected power cells 16a1, 16a2, 16a3, . . . , 16c4, 16c5. Alternatively, controller 18 may store (e.g., in one or more lookup tables) predetermined phase angle relationships for various configurations of the array of series-connected power cells 16a1, 16a2, 16a3, . . . , 16c4, 16c5.

Referring now to FIGS. 8A-8G3, example table values of the leg-to-leg phase relationship for multi-cell power supplies utilizing anywhere from two to eight power cells per leg. In these tables, the legs are assumed to be in a three-phase Y arrangement having legs A, B and C. Each table has been abbreviated to provide the same values without regard to which power cell in a given leg is bypassed. For example, in FIG. 8A, a leg having A cells=1, corresponds to any configuration in which one of the two power cells in a two power cell leg has been bypassed.

In addition, because a bypass condition in a multi-cell power supply results in identical phase relationships without regard to which legs have the number of bypassed power cells, a multi-cell power supply with A=5, B=3 and C=5, is the same as a multi-cell power supply having non-bypassed cells A=5, B=5 and C=3. The tables, therefore, provide an easy reduced form to cover all of these combinations. In the tables, the A cell is always listed as having the most non-bypassed power cells, the B, second most non-bypassed power cells, and C the least non-bypassed power cells. The tables may be used in a microprocessor scheme as lookup tables to determine the proper phase relationship in a power supply having bypassed power cells.

In the tables, the term Vmax % is used to indicate the maximum voltage that would be available under a bypassed condition as a percentage of the normal line-to-line voltage. All of the phase angles are in relationship to the normal A vector in a multi-cell power supply having no bypassed cells. As an example, Aρ is the angle between the A leg in a bypassed mode as compared to the A leg in an un-bypassed mode. All of the angles given are in relation to the vector for the A leg in an un-bypassed mode.

Thus, for example, referring to FIGS. 7A and 8D, with bypass device 30b4 reconfigured to de-bypass power cell 16b4, multi-cell power supply 10 corresponds to an A=5, B=5 and C=3 configuration, in which Vmax %=85.1, Aρ=12.5°, Bρ=107.5°, and Cρ=240°. Thus, as shown in FIG. 7A, the phase angle between phase A and phase B is (107.5°−12.5°)=95°, the phase angle between phase B and phase C is (240°−107.5°)=132.5°, and the phase angle between phase C and phase A is (372.5°−240°)=132.5°.

Referring again to FIG. 6, at step 78, controller 18 resumes the operation of multi-cell power supply 10. As shown in FIG. 7A, with power cell 16b4 de-bypassed, multi-cell power supply 10 provides line-to-line voltages VAC, VBA, VCB having equal magnitudes of 3542V (85.1% of 4160V), and having a mutual phase displacement of 120° between VAC, VBA, and VCB. In this regard, previously bypassed power cell 16b4 has been de-bypassed without stopping multi-cell power supply 10.

Persons of ordinary skill in the art will understand that the time required to temporarily inhibit multi-cell power supply 10, de-bypass previously bypassed power cell 16b4, determine modified phase angles between phases A, B and C, and resume operation of multi-cell power supply 10 is very brief, e.g., between about 100 ms to about 350 ms, or other similar duration. During this time interval, load 12 rides-through this power interruption due to the inertia of the load. If there is low inertia, load 12 may slow down significantly. However, unlike previous techniques, methods in accordance with this invention do not stop multi-cell power supply 10, which would completely shut down power to and halt operation of load 12.

Figure 7B:
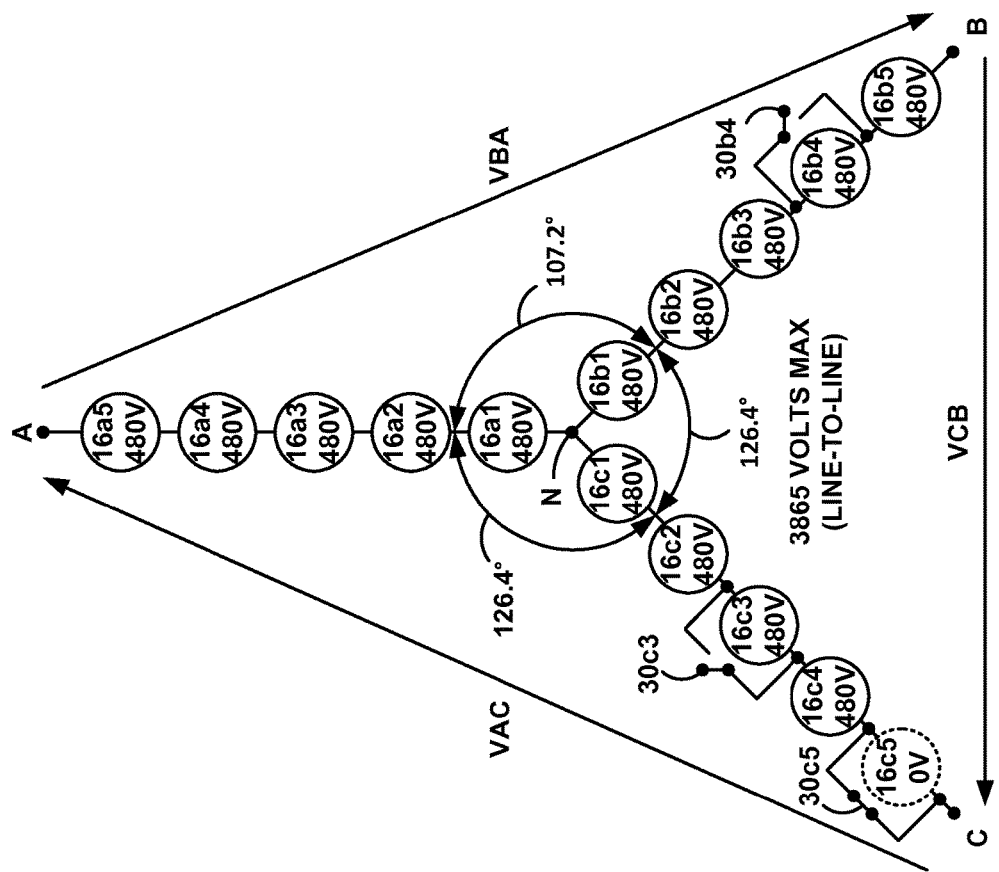
FIG. 7B is an example voltage diagram of an array of series-connected power cells in which a second power cell is de-bypassed in accordance with this invention.

Example process 70 of FIG. 6 may be repeated with previously bypassed power cell 16c3. Thus, at step 72, the operation of multi-cell power supply 10 is inhibited, and at step 74, bypass device 30 of a faulted power cell (e.g., power cell 16c3) is reconfigured to de-bypass power cell 16c3, thus reconfiguring the array of series-connected power cells 16a1, 16a2, 16a3, . . . , 16c4, 16c5. For example, FIG. 7B illustrates an array of series-connected power cells 16a1, 16a2, 16a3, . . . , 16c4, 16c5 in which previously bypassed power cell 16c3 is de-bypassed.

Referring again to FIG. 6, at step 76, modified phase angles between phases A, B and C are determined for the reconfigured array of series-connected power cells 16a1, 16a2, 16a3, . . . , 16c4, 16c5. Referring to FIGS. 7B and 8D, with bypass device 30c3 of power cell 16c3 reconfigured to de-bypass power cell 16c3, multi-cell power supply 10 corresponds to an A=5, B=5 and C=4 configuration, in which Vmax %=92.9, Aρ=6.4°, Bρ=113.6°, and Cρ=240°. Thus, as shown in FIG. 7B, the phase angle between phase A and phase B is (113.6°−6.4°)=107.2°, the phase angle between phase B and phase C is (240°−113.6°)=126.4°, and the phase angle between phase C and phase A is (366.4°−240°)=126.4°.

Referring again to FIG. 6, at step 78, controller 18 resumes the operation of multi-cell power supply 10. As shown in FIG. 7B, with power cell 16c3 de-bypassed, multi-cell power supply 10 provides line-to-line voltages VAC, VBA, VCB having equal magnitudes of 3865V (92.9% of 4160V), and having a mutual phase displacement of 120° between VAC, VBA, and VCB. In this regard, previously bypassed power cell 16c3 has been de-bypassed without stopping multi-cell power supply 10.

Figure 7C:
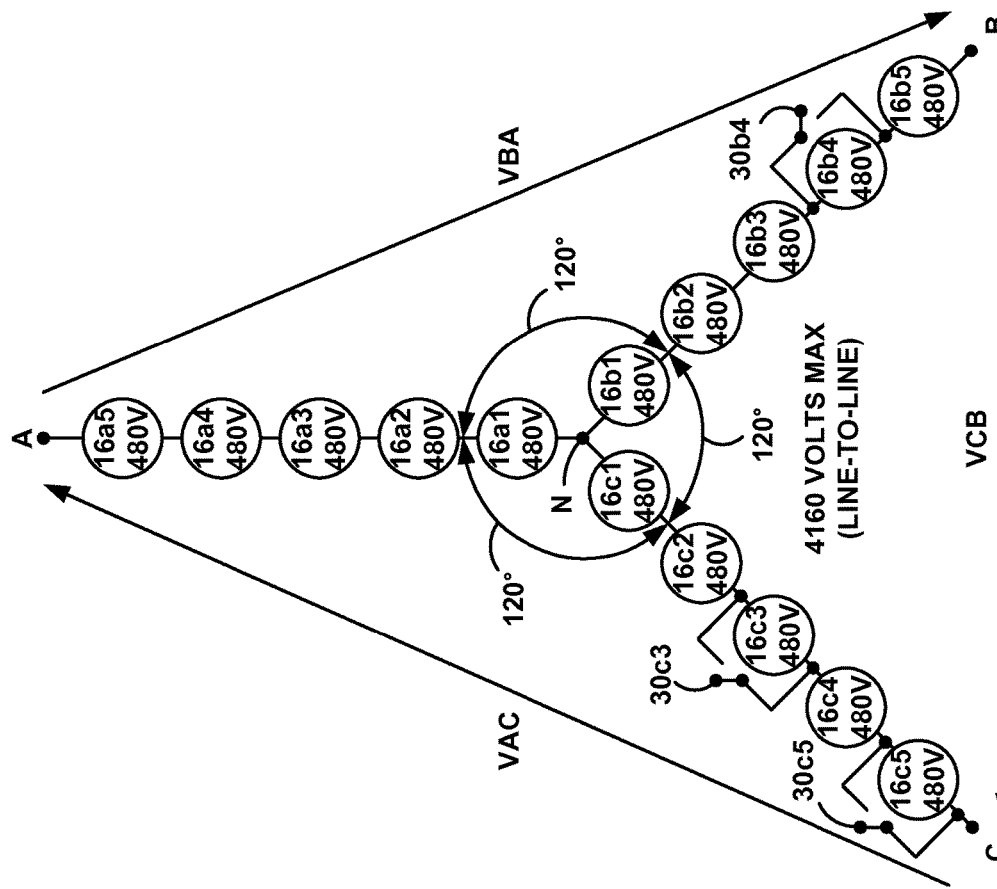
FIG. 7C is an example voltage diagram of an array of series-connected power cells in which a third power cell is de-bypassed in accordance with this invention.

Likewise, example process 70 of FIG. 6 may be repeated with previously bypassed power cell 16c5. Thus, at step 72, the operation of multi-cell power supply 10 is inhibited, and at step 74, bypass device 30 of a faulted power cell (e.g., power cell 16c5) is reconfigured to de-bypass power cell 16c5, thus reconfiguring the array of series-connected power cells 16a1, 16a2, 16a3, . . . , 16c4, 16c5. For example, FIG. 7C illustrates an array of series-connected power cells 16a1, 16a2, 16a3, . . . , 16c4, 16c5 in which previously bypassed device 30c5 of power cell 16c5 is reconfigured to de-bypass power cell 16c5.

Referring again to FIG. 6, at step 76, modified phase angles between phases A, B and C are determined for the reconfigured array of series-connected power cells 16a1, 16a2, 16a3, . . . , 16c4, 16c5. Referring to FIGS. 7C and 8D, with bypass device 30c5 of power cell 16c5 reconfigured to de-bypass power cell 16c5, multi-cell power supply 10 corresponds to an A=5, B=5 and C=5 configuration, in which Vmax %=100, Aρ=0°, Bρ=120°, and Cρ=240°. Thus, as shown in FIG. 7C, the phase angle between phase A and phase B is (120°−0°)=120°, the phase angle between phase B and phase C is (240°−120°)=120°, and the phase angle between phase C and phase A is (360°−240°)=120°.

Referring again to FIG. 6, at step 78, controller 18 resumes the operation of multi-cell power supply 10. As shown in FIG. 7C, with power cell 16c5 de-bypassed, multi-cell power supply 10 provides line-to-line voltages VAC, VBA, VCB having equal magnitudes of 4160V (100% of 4160V), and having a mutual phase displacement of 120° between VAC, VBA, and VCB. In this regard, previously bypassed power cell 16c5 has been de-bypassed without stopping multi-cell power supply 10.

Persons of ordinary skill in the art will understand that other techniques (e.g., the alternative techniques described in the '909 patent) may be used to determine phase angles between phases A, B and C of the reconfigured array of series-connected power cells 16a1, 16a2, 16a3, . . . , 16c4, 16c5 so that a previously bypassed power cell may be de-bypassed without stopping multi-cell power supply 10.

The foregoing merely illustrates the principles of this invention, and various modifications can be made by persons of ordinary skill in the art without departing from the scope and spirit of this invention.

The invention claimed is:

1. A method of operating a multi-cell power supply comprising a controller and a plurality of series-connected power cells in each of a plurality of legs, each power cell comprising an inverter and a bypass device to selectively bypass and de-bypass the power cell, wherein after a first power cell faults and is bypassed as a result of a fault, the method comprising through operation of the controller:
   temporarily inhibiting operation of the multi-cell power supply by inhibiting gating signals to semiconductor switches of each inverter of each power cell;
   reconfiguring a bypass device of the first power cell to de-bypass the first power cell and reconfiguring the plurality of series-connected power cells;
   modifying phase angles for reconfigured series-connected power cells; and
   resuming the operation of the multi-cell power supply using modified phase angles without halting operation of a load powered by the multi-cell power supply;
   wherein de-bypass of the first power cell comprises:
      during a time period when the first power cell is bypassed, querying, by the controller, a processor of the first power cell to determine whether the first power cell experienced an overvoltage fault, an over-temperature fault or a line fault:,
      reporting, by the processor, operating conditions of the first power cell in response to the querying from the controller; and
      de-bypassing the first power cell if the first power cell experienced an overvoltage fault, an over-temperature fault or a line fault and the overvoltage fault, over-temperature fault or line fault no longer exists.

2. The method of claim 1, further comprising determining if the bypassed power cell is functional prior to de-bypassing the first power cell.

3. The method of claim 1, wherein each of the legs is connected between a node and a respective line, and the multi-cell power supply comprises line-to-line voltage outputs between pairs of the legs, and wherein the method further comprises:
   controlling the plurality of power cells to maximize the line-to-line voltage outputs and
   maintaining the line-to-line voltage outputs so as to correspond in magnitude.

4. The method of claim 3, further comprising balancing a line-to-line phase.

5. The method of claim 3, wherein maintaining the line-to-line voltage outputs so as to correspond in magnitude comprises adjusting leg-to-leg phase relationships.

6. The method of claim 5, wherein adjusting comprises calculating leg-to-leg phase angles to produce balanced line-to-line voltages.

7. The method of claim 5, wherein adjusting comprises using predetermined angles based upon a number of faulted cells in each of the legs.

8. The method of claim 7, wherein the predetermined angles are obtained from tables of values.

9. The method of claim 1, wherein, if the first power cell experienced an overvoltage fault, determining, by the controller, if the multi-cell power supply absorbed regenerative power from a load prior to the overvoltage fault of the first power cell.

10. A multi-cell power supply comprising:
   a plurality of series-connected power cells in each of a plurality of legs, each power cell comprising an inverter and a bypass device to selectively bypass and de-bypass the power cells; and a controller, after a first power cell faults and is bypassed as a result of a fault, configured to:
temporarily inhibit operation of the multi-cell power supply by inhibiting gating signals to semiconductor switches of each inverter of each power cell;
reconfigure a bypass device of the first power cell to de-bypass the first power cell and reconfigure the plurality of series-connected power cells;
modify phase angles for reconfigured series-connected power cells; and
resume the operation of the multi-cell power supply using modified phase angles without halting operation of a load powered by the multi-cell power supply;
wherein the controller is further configured to, during a time period when the first power cell is bypassed as a result of a fault:
query a processor of the first power cell to determine whether the first power cell experienced an over-voltage fault, an over-temperature fault or a line fault prior to the first power cell being bypassed, and
de-bypass the first power cell if the first power cell experienced an overvoltage fault, an over-temperature fault or a line fault and the overvoltage fault, over-temperature fault or line fault no longer exists based on reported operating conditions by the processor of the first power cell in response to a query from the controller.

11. The multi-cell power supply of claim 10, wherein the controller determines if the bypassed power cell is functional prior to de-bypassing the first power cell.

12. The multi-cell power supply of claim 10, wherein each of the legs is connected between a node and a respective line, and the multi-cell power supply comprises line-to-line voltage outputs between pairs of the legs, and wherein the controller controls the plurality of power cells to maximize the line-to-line voltage outputs and maintain the line-to-line voltage outputs so as to correspond in magnitude.

13. The multi-cell power supply of claim 12, wherein the controller balances a line-to-line phase.

14. The multi-cell power supply of claim 12, wherein the controller adjusts leg-to-leg phase relationships to maintain the line-to-line voltage outputs so as to correspond in magnitude.

15. The multi-cell power supply of claim 14, wherein the controller calculates leg-to-leg phase angles to produce balanced line-to-line voltages.

16. The multi-cell power supply of claim 14, wherein the controller adjusts leg-to-leg phase relationships by using predetermined angles based upon a number of faulted cells in each of the legs.

17. The multi-cell power supply of claim 16, wherein the controller obtains the predetermined angles from tables of values.

18. The multi-cell power supply of claim 10, wherein, if the first power cell experienced an overvoltage fault, the controller is further configured to determine if the multi-cell power supply absorbed regenerative power from a load prior to the overvoltage fault of the first power cell.

* * * * *